(12) United States Patent
Sakoh et al.

(10) Patent No.: US 7,814,235 B2
(45) Date of Patent: Oct. 12, 2010

(54) PAGE DATA RECEPTION METHOD, PAGE DATA PROVIDING METHOD, DEVICE THEREOF, AND PROGRAM

(75) Inventors: Noriyuki Sakoh, Kanagawa (JP); Takeshi Iwatsu, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 10/567,033

(22) PCT Filed: May 18, 2004

(86) PCT No.: PCT/JP2004/007012

§ 371 (c)(1),
(2), (4) Date: Feb. 3, 2006

(87) PCT Pub. No.: WO2005/015411

PCT Pub. Date: Feb. 17, 2005

(65) Prior Publication Data

US 2006/0224783 A1    Oct. 5, 2006

(30) Foreign Application Priority Data

Aug. 11, 2003  (JP) .............................. 2003-291741
Sep. 29, 2003  (JP) .............................. 2003-338918

(51) Int. Cl.
*G06F 3/00*       (2006.01)
*G06F 11/00*      (2006.01)
*G06F 15/16*      (2006.01)

(52) U.S. Cl. ................................. 710/5; 714/4; 709/201

(58) Field of Classification Search ..................... 710/5; 714/4; 709/201
See application file for complete search history.

(56) References Cited

U.S. PATENT DOCUMENTS 6,014,696 A * 1/2000 Araki et al. ................. 709/219
6,021,262 A * 2/2000 Cote et al. .................... 714/48
6,256,747 B1 * 7/2001 Inohara et al. ................. 714/4

(Continued)

FOREIGN PATENT DOCUMENTS

JP         11-282804         10/1999

(Continued)

OTHER PUBLICATIONS

U.S. Appl. No. 10/526,902, filed Aug. 16, 2005, Yamashita et al.

(Continued)

*Primary Examiner*—Henry W Tsai
*Assistant Examiner*—Juanito C Borromeo
(74) *Attorney, Agent, or Firm*—Oblon, Spivak, McClelland, Maier & Neustadt, L.L.P.

(57) ABSTRACT

Even in the case where a first request signal for requesting the source of the top page and a second request signal for requesting the source of A Corporation CD sales page were transmitted from a client terminal 2, if the source of an information page has been stored in a portal server 4, the above source of the information page is transmitted from the portal server 4 to the client terminal 2 before the source of the top page or the source of the A Corporation CD sales page is transmitted from the portal server 4 or the contents sales server 5.

42 Claims, 22 Drawing Sheets

U.S. PATENT DOCUMENTS

| | | | |
|---|---|---|---|
| 6,785,864 B1 * | 8/2004 | Te et al. ....................... | 715/205 |
| 2002/0116534 A1 * | 8/2002 | Teeple ........................ | 709/246 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2000-222360 | 8/2000 |
| JP | 2002-132625 | 5/2002 |
| JP | 2002-278931 | 9/2002 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

PAGE DATA RECEPTION METHOD, PAGE DATA PROVIDING METHOD, DEVICE THEREOF, AND PROGRAM

TECHNICAL FIELD

The present invention relates to a method for receiving page data, a method for providing page data, and apparatus and program thereof, and is suitably applied to the case where the operator who operates a system built by a server and a predetermined network notifies the user of some information, for example.

BACKGROUND ART

In recent years, a system that the users can purchase a CD without going to a CD shop is becoming popular (see Patent Document 1 for example). It is enabled by that the shop establishes Web pages to sell for example CDs (Compact Discs) (hereinafter, this is also simply referred to as pages) by using a server connected to a network such as the Internet.

Patent Document 1—Japanese Laid-Open Patent Publication No. 2003-44484

By the way, in such system, it is necessary to constantly perform maintenance while stopping the system server. In such case, it is desirable that information about maintenance schedule (hereinafter, this is referred to as maintenance information) is notified the users in advance.

Heretofore, such maintenance information is notified at a predetermined part on the Web page that is accessed by the user generally at first (hereinafter, this is referred to as the top page) to inform the user about the above maintenance information.

However, it is considered that also there are many users who do not look carefully the top page. Thus, in such conventional method, there has been a problem that the above maintenance information could not be surely informed the users.

DISCLOSURE OF THE INVENTION

Considering the above point, the present invention has been done, and provides a method for receiving page data, a method for providing page data, and apparatus and program thereof that can surely inform the users about information to let them know.

To solve the above problem, according to the present invention, in a page data receiving method, the first step of transmitting a first request signal for requesting first page data, the second step of transmitting a second request signal for requesting second page data, the third step of receiving the first page data after the reception of notification page data indicating predetermined notification information according to the first request signal, and the fourth step of receiving the second page data after the reception of the notification page data according to the second request signal are provided.

Further, according to the present invention, in a page data providing method for a page data providing apparatus that stores notification page data indicating predetermined notification information and first page data, the first step, when the apparatus received a first request signal for requesting the first page data from a terminal unit, of transmitting the notification page data to the terminal unit before transmitting the first page data, and the second step, when the terminal unit transmitted a second request signal for requesting second page data to another page data providing apparatus that provides the second page data, of transmitting the notification page data to the terminal unit before the second page data is transmitted from the above other page data providing apparatus according to the second request signal are provided.

Further, according to the present invention, in a terminal unit, transmitting means for transmitting a first request signal for requesting first page data and a second request signal for requesting second page data, and receiving means, after receiving notification page data in which predetermined notification information is indicated according to the first request signal, for receiving the first page data, and after receiving the notification page data according to the second request signal, for receiving the second page data are provided.

Further, according to the present invention, in a page data providing apparatus that stores notification page data indicating predetermined notification information and first page data, receiving means for receiving a first request signal for requesting the first page data from a terminal unit, and transmitting means for transmitting the notification page data to the terminal unit, before transmitting the first page data according to the first request signal received by the receiving means, and when the terminal unit transmitted a second request signal for requesting second page data to another page data providing apparatus that provides the second page data, for transmitting the notification page data to the terminal unit, before the second page data is transmitted from the above other page data providing apparatus according to the second request signal are provided.

Further, according to the present invention, in a page data providing method for a page data providing apparatus storing predetermined page data, when the page data providing apparatus received a request signal for requesting page data and information necessary for acceptance that is necessary for accepting the above request signal from a terminal unit, the page data providing apparatus accepts the above request signal and transmits the page data to the terminal unit.

Further, according to the present invention, in a page data providing apparatus storing predetermined page data, when the page data providing apparatus received a request signal for requesting page data and information necessary for acceptance that is necessary for accepting the above request signal from a terminal unit, the page data providing apparatus accepts the above request signal and transmits the page data to the terminal unit.

Further, according to the present invention, in a page data receiving program for making a terminal unit execute receiving, the first step of transmitting a first request signal for requesting first page data, the second step of transmitting a second request signal for requesting second page data, the third step, after the reception of notification page data in which predetermined notification information is indicated according to the first request signal, of receiving the first page data, and the fourth step, after the reception of the notification page data according to the second request signal, of receiving the second page data are provided.

As a result, this terminal unit receives notification page data indicating notification information before receiving first page data or second page data according to a first request signal or a second request signal. Thereby, only the notification information can be preferentially displayed.

According to the present invention, a terminal unit can display notification page data in which notification information is indicated, before displaying a page based on first page data or second page data. As a result, the users can be surely informed about the above notification information.

BEST MODE FOR CARRYING OUT THE INVENTION

An embodiment of the present invention will be described in detail with reference to the accompanying drawings.

(1) First Embodiment

(1-1) Whole Configuration of Contents Sales System

Figure 1:
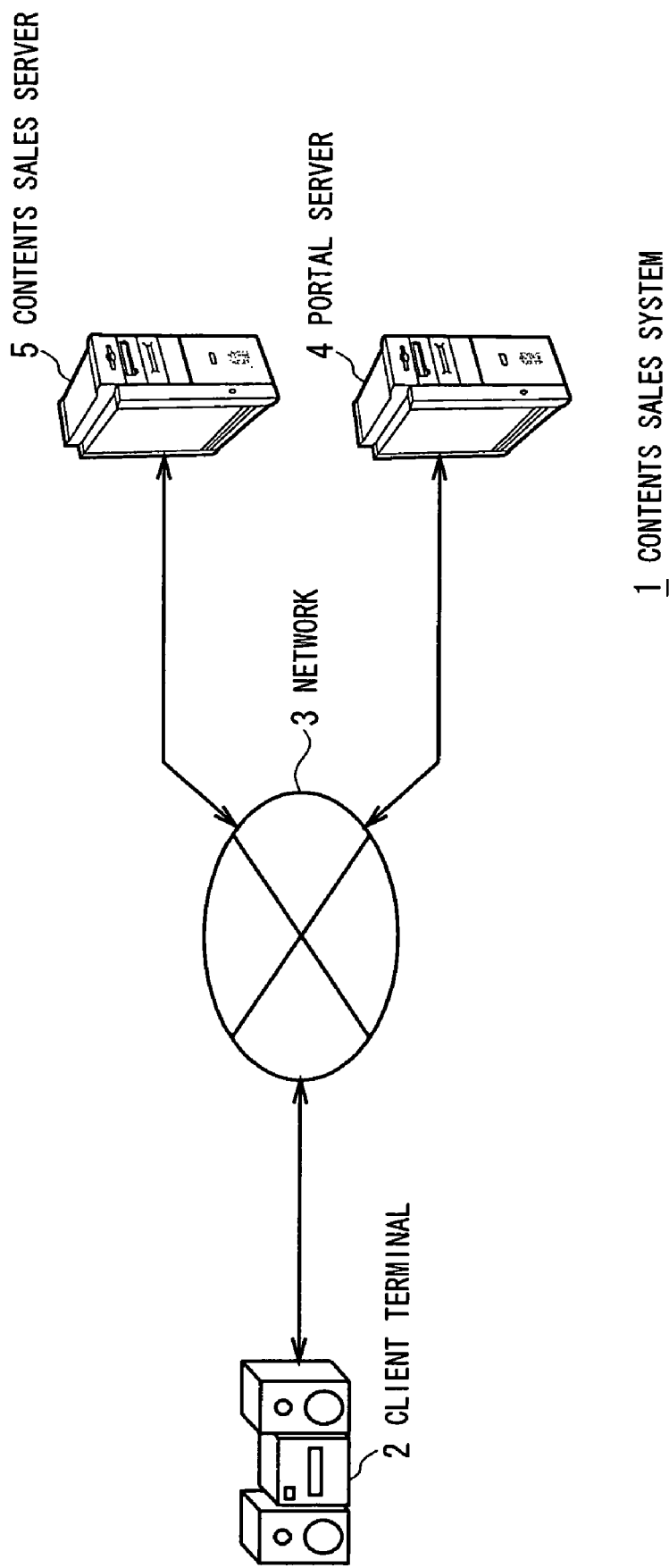
FIG. 1 is a schematic diagram showing the whole construction of a contents sales system in a first embodiment according to the present invention.

Referring to FIG. 1, the reference numeral 1 designates a contents sales system as a whole, and a client terminal 2 of the user who is allowed to participate in the contents sales system 1 is connected via a predetermined network 3 to a portal server 4 for managing the client terminal 2, and to a contents sales server 5 for selling a CD (Compact Disc)/DVD (Digital Versatile Disc) in which various contents are recorded.

Figure 2:
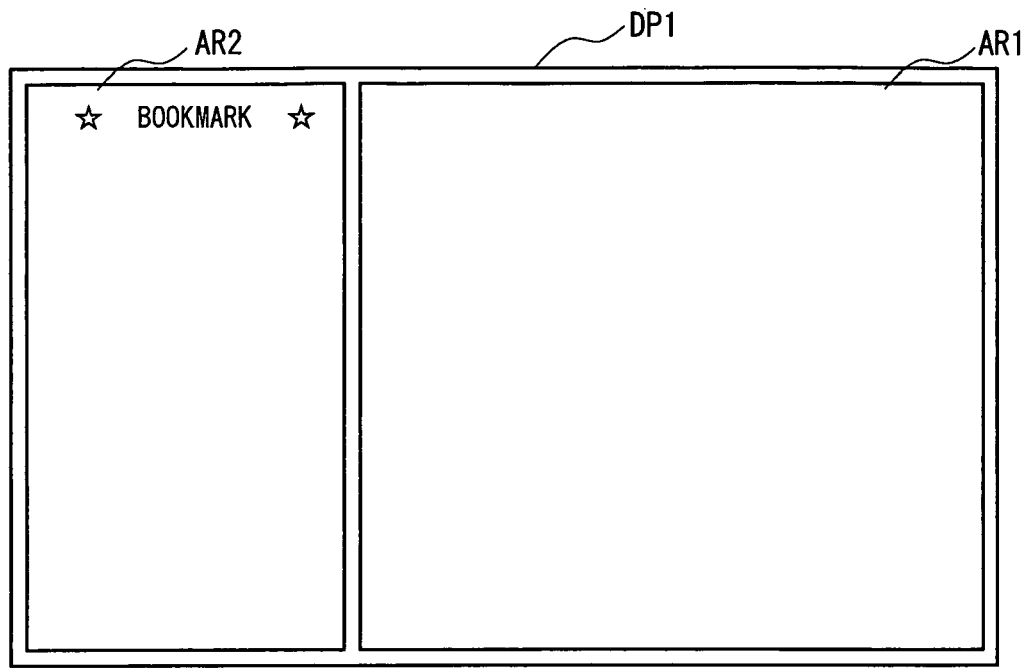
FIG. 2 is a schematic diagram showing a basic picture (1).

The client terminal 2 displays a basic picture DP1 as shown, for example, in FIG. 2 in the display section, when the switch is turned on by the user. This basic picture DP1 has a page display area AR1 in which various pages will be displayed based on a source described by a language such as XML (extensible Markup Language), and a bookmark display area AR2 in which bookmarks previously registered by the user will be displayed.

For example, when a top page display operation for displaying the top page of the contents sales system 1 is performed, the client terminal 2 transmits a request signal for requesting the transmission of the source of the top page, and user's ID and password which have been registered beforehand, to the portal server 4 storing the source.

If receiving the request signal and the ID and password, the portal server 4 performs predetermined user authentication processing based on the ID and password.

Then when the user of the client terminal 2 is confirmed as a registered user as a result of the user authentication processing, the portal server 4 generates authentication result information which indicates the result of the authentication and the time when the authentication was completed (hereinafter, this is referred to as authentication completion time), and transmits the generated authentication result information and the source of the top page in accordance with the request signal from the client terminal 2, to the client terminal 2.

Figure 3:
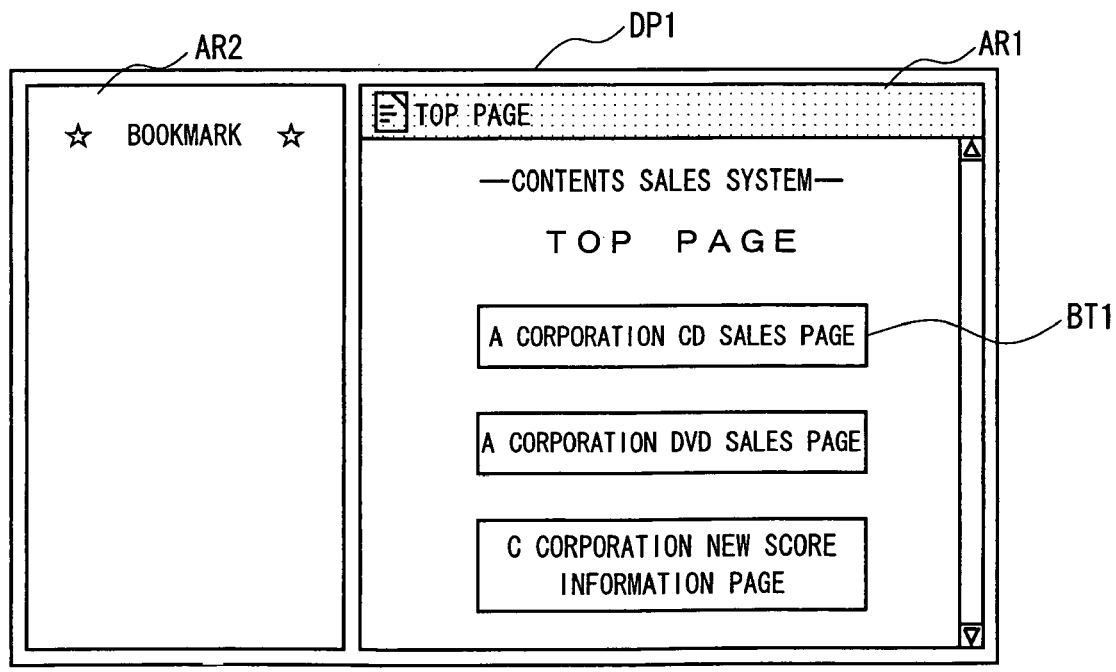
FIG. 3 is a schematic diagram showing a basic picture (2).

If receiving the authentication result information and the source of the top page from the portal server 4, the client terminal 2 displays the top page in the page display area AR1 based on the source, as shown, for example, in FIG. 3. In the top page, the title of a page "top page" is displayed in the upper part, and therebelow there are displayed a plurality of buttons including a button BT1 to which the link to the A Corporation CD sales page is assigned, and buttons linking to other pages are assigned.

For example, when the button BT1 in the top page is selected by user's operation, after recognizing the URL (Uniform Resource Locator) of the A Corporation CD sales page with reference to the source of the top page, the client terminal 2 transmits to the contents sales server 5 managed by the A company, the request signal for requesting the transmission of the source of the A Corporation CD sales page, and the authentication result information recently obtained from the portal server 4, based on the recognition.

The contents sales server 5 which has received the request signal and the authentication result information, is arranged to discriminate whether or not the user of the client terminal 2 has recently been authorized as the registered user (for example, within past 1 minute) by referring to the authentication completion time, etc. in the authentication result information. For example, as a result of the discrimination, if recognizing that the user of the client terminal 2 has recently been authenticated as the registered user, the contents sales server 5 transmits the source of the A Corporation CD sales page in accordance with the request signal, to the client terminal 2.

As a result of the discrimination, if recognizing that the user of the client terminal 2 has not recently been authorized as the registered user, the contents sales server 5 does not transmit the source of the A Corporation CD sales page to the client terminal 2.

Figure 4:
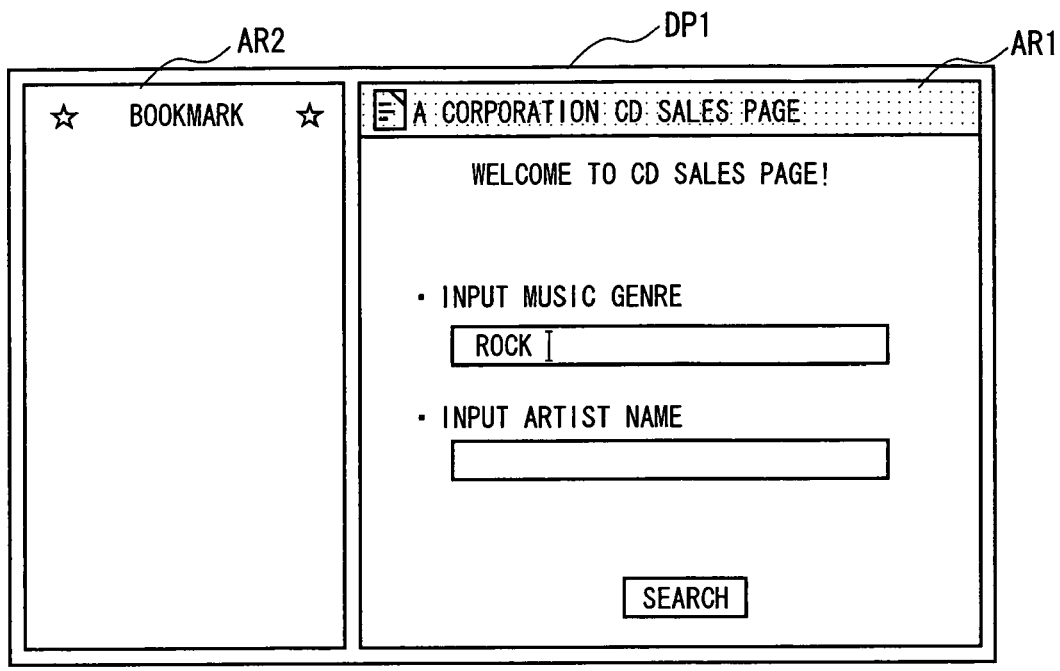
FIG. 4 is a schematic diagram showing a basic picture (3).

The client terminal 2 which has received the source of the A Corporation CD sales page from the contents sales server 5 displays the A Corporation CD sales page in the page display area AR1 based on the source, as shown in FIG. 4. Thereby, the user of the client terminal 2 can utilize a CD sales service provided by the contents sales server 5, by way of the A Corporation CD sales page.

In this connection, in the source of the A Corporation CD sales page described by the XML or the like, there are described not only title information about the page: "A Corporation CD sales page" or the like but also service identification information for indicating that the page is intended for providing the CD sales service.

Figure 5:
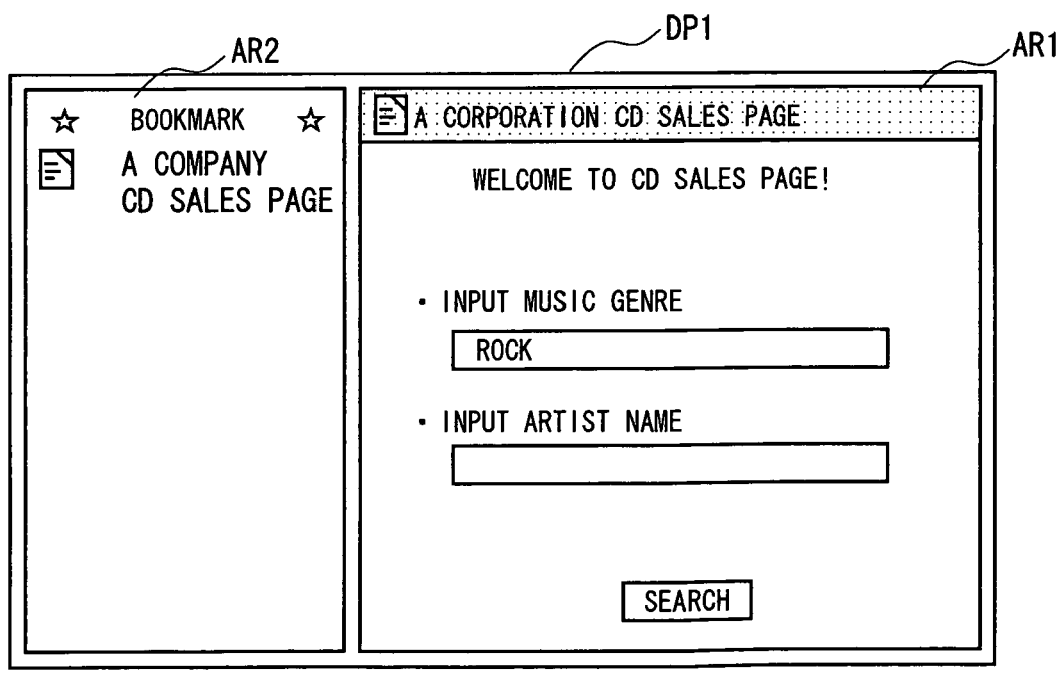
FIG. 5 is a schematic diagram showing a basic picture (4).

Thereafter, if bookmark setting operation for bookmarking the A Corporation CD sales page is performed by the user, the client terminal 2 stores, in correspondence with the URL of the CD sale page, the title information "A Corporation CD sales page" and the service identification information which are described in the source of the A Corporation CD sale page, and thereafter displays only the title information "A Corporation CD sales page" in the bookmark display area AR2, as shown, for example, in FIG. 5.

In this way, the client terminal 2 can display the A Corporation CD sales page provided by the contents sales server 5 in the display section, and can bookmark the displayed A Corporation CD sales page.

(1-2) Configuration Of Portal Server

Figure 6:
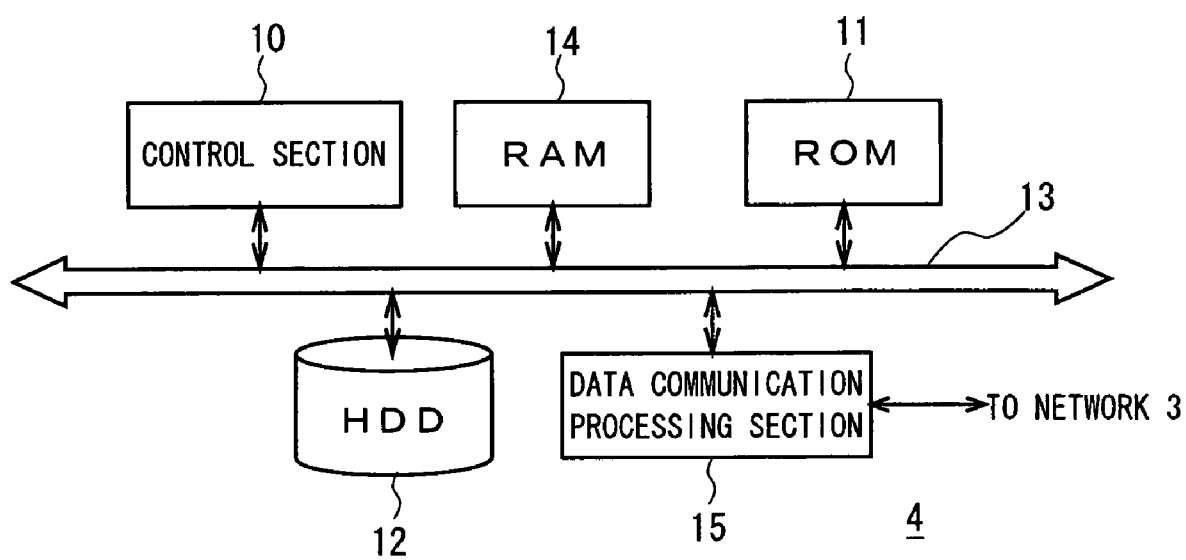
FIG. 6 is a block diagram showing the circuit configuration of a portal server.

As shown in FIG. 6, a control section 10 consisting of a CPU (Central Processing Unit) suitably develops a basic program and various programs which are stored in a ROM (Read Only Memory) 11 or a hard disk drive 12 to a RAM (Random Access Memory) 14 via a bus 13, and executes the programs, as a result of which the portal server 4 performs various processing such as user authentication processing. The ID and password of each user allowed to participate in the contents sales system 1 have been also stored beforehand in the hard disk drive 12.

For example, if receiving the user's ID and password from the client terminal 2 successively via the network 3 and a data communication processing section 15, the control section 10 of the portal server 4 starts user authentication processing to determine whether or not the ID and password of the user have been stored in the hard disk drive 12.

Then, if recognizing that the ID and password of the user have been stored in the hard disk drive 12 as a result of the determination, the control section 10 of the portal server 4 authenticates the user of the client terminal 2 as the registered user, and transmits authentication result information indicating the authentication result and the authentication completion time to the client terminal 2. On the other hand, if recognizing that the ID and password of the user are not stored in the hard disk drive 12, the control section 10 does not authenticate the user of the client terminal 2 as the registered user, and transmits the authentication result information indicating the authentication result to the client terminal 2.

(1-3) Configuration of Contents Sales Server

Figure 7:
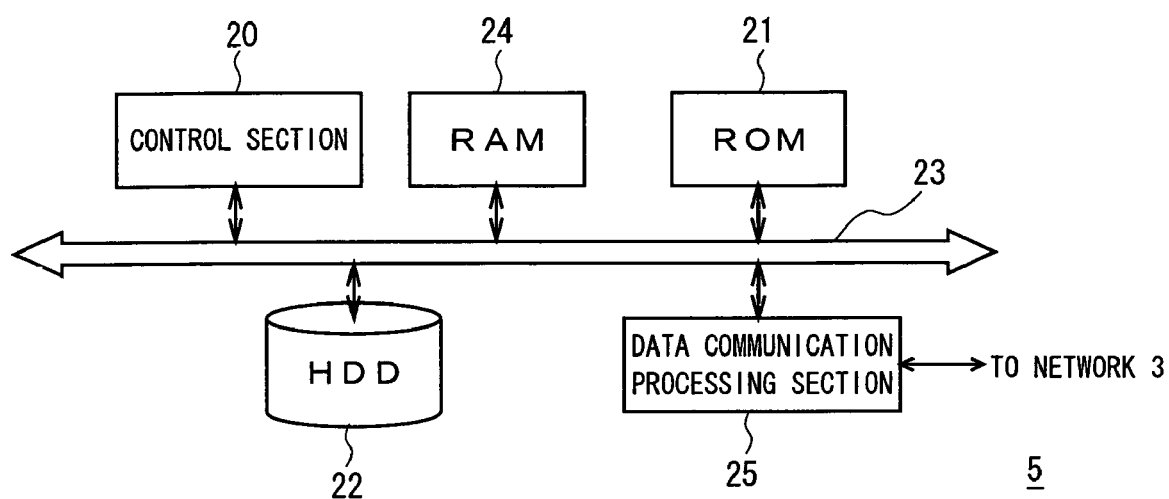
FIG. 7 is a block diagram showing the circuit configuration of a contents sales server.

As shown in FIG. 7, a control section 20 consisting of a CPU suitably develops a basic program and other various programs stored in a ROM 21 or a hard disk drive 22 to a RAM 24 via a bus 23 and executes the programs, as a result of which the contents sales server 5 performed CD sales processing for making the user purchase a CD and other various processing. The source of various pages including the A Corporation CD sales page has been stored beforehand in the hard disk drive 22.

If receiving a request signal for requesting the authentication result information and the source of the A Corporation CD sales page from the client terminal 2, successively via the network 3 and a data communication processing section 25, the control section 20 of the contents sales server 5 first determines whether or not the user of the client terminal 2 has recently been authenticated as the registered user (for example, within past 1 minute) by referring to the authentication completion time or the like in the authentication result information.

In practice, in the hard disk drive 22 of the contents sales server 5, definition information is stored beforehand in which the authentication result information is defined to be effective within 1 minute after the completion of user authentication. If recognizing that the authentication result information from the client terminal 2 is effective based on the definition information, the control section 20 of the contents sales server 5 determines that the user of the client terminal 2 has recently been authenticated as the registered user. In addition, for example, when the portal server 4 generates the authentication result information, validity period information indicating the validity period may be included in the authentication result information, and the control section 20 of the contents sales server 5 may determine the effectiveness of the authentication result information, based on the validity period information in the authentication result information.

If recognizing that the user of the client terminal 2 has recently been authenticated as the registered user as a result of the above determination, the control section 20 of the contents sales server 5 reads the source of the A Corporation CD sales page in accordance with the request signal from the hard disk drive 22, and transmits the source to the client terminal 2.

(1-4) Configuration of Client Terminal (1-4-1) Circuit Configuration

Figure 8:
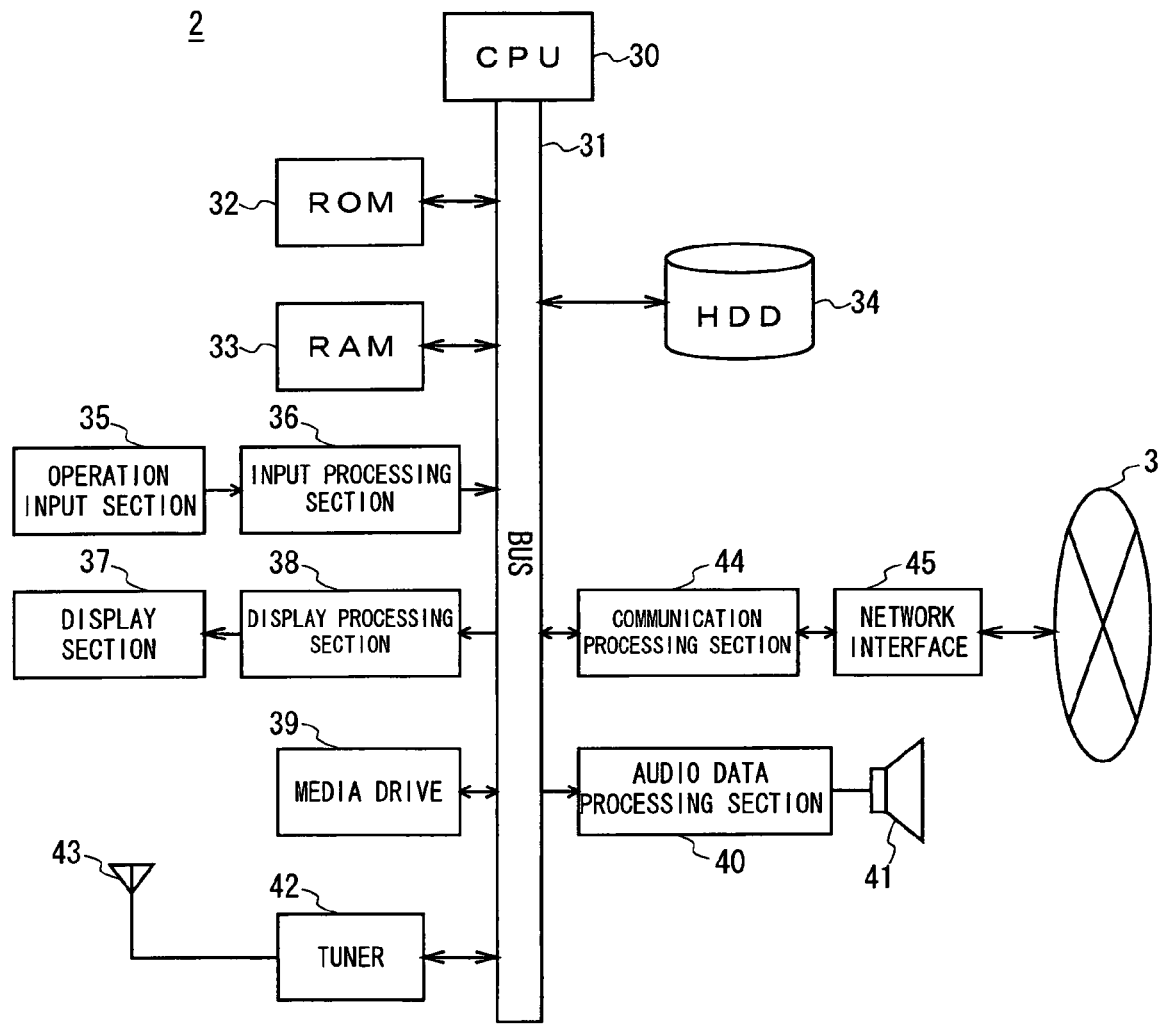
FIG. 8 is a block diagram showing the circuit configuration of a client terminal.

As shown in FIG. 8, the CPU 30 of the client terminal 2 performs the overall control and predetermined data processing or the like, based on a basic program such as an OS (Operating System) and various application programs read from a ROM 32 connected via a bus 31 to be developed in a RAM 33. For example, the CPU performs a communication operation via the network 3, an input/output operation by the user, the reproduction of contents from media and the writing of contents downloaded from a radio station in a hard disk drive (HDD) 34 and the management of them.

An operation input section 35 sends to an input processing section 36, input information in accordance with the user's operation on various operation elements attached to the casing surface of a main body part and to a remote controller (not shown). The input information is subjected to a predetermined processing in the input processing section 36, and is sent to the CPU 30 as an operation command, so that the CPU 30 can perform processing in accordance with the operation command.

A display section 37, which may be, for example, a display device such as a liquid crystal display directly attached to the casing surface of a main body part, or an externally mounted display device, displays various information inputted by way of a display processing section 38. In the case of this embodiment, the display section 37 is smaller (about 5 inches) than the display used for normal televisions and personal computers.

A media drive 39 is, for example, a drive for reproducing a CD and a memory stick (registered trademark) which comprises a flash memory, etc., and the reproduction results are subjected to digital/analog conversion processing through an audio data processing section 40, and thereafter are outputted from a two-channel speaker 41.

When the data reproduced via the media drive 39 is audio contents of a musical composition, the CPU 30 also enables the data to be stored in the hard disk drive 34 as an audio data file.

Further, the CPU 30 is also able to read out a plurality of still images stored in a memory stick (registered trademark) by means of the media drive 39, so as to display the images as a slide show in the display section 37 through the display processing section 38.

Further, the CPU 30 is able to read out a plurality of musical compositions stored in the hard disk drive 34 by randomly accessing, so as to reproduce and output them in the order of user's request just like a jukebox.

A tuner section 42 is, for example, an AM/FM radio tuner, and demodulates a broadcast signal received with an antenna 43 based on the control of the CPU 30, so as to output the demodulation result as broadcast audio from the speaker 41 through the audio data processing section 40.

Based on the control of the CPU 30, a communication processing section 44 performs encoding processing of transmitting data so as to transmit the data to an external network compatible apparatus successively via a network interface 45 and the network 3, and to perform the decoding processing of received data received from the external network compatible apparatus via the network interface 45 so as to transfer the data to the CPU 30.

(1-4-2) Directory Management

Figure 9:
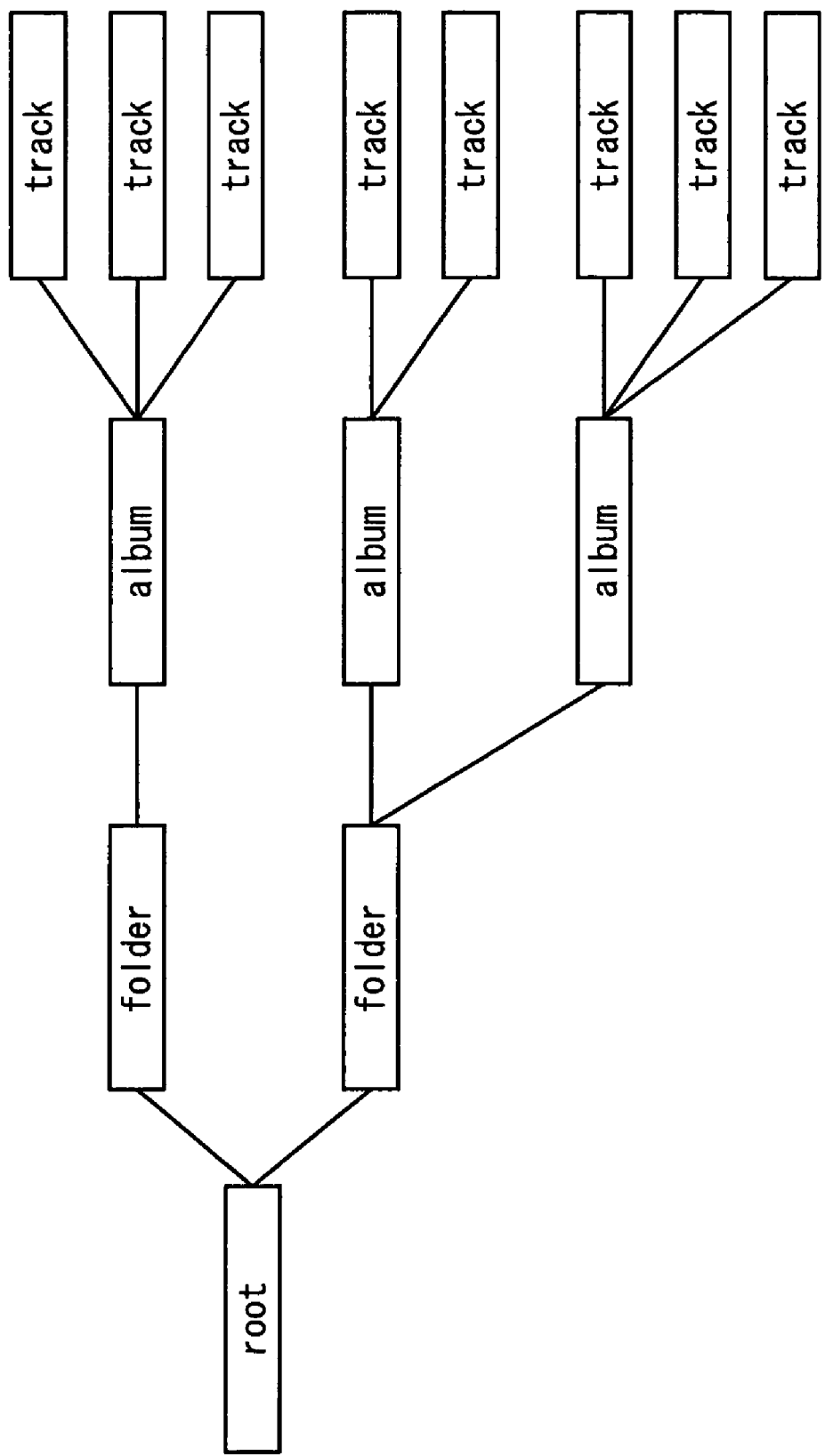
FIG. 9 is a schematic diagram showing a folder configuration.

The CPU 30 of the client terminal 2 manages contents stored in the hard disk drive 34 in a directory configuration shown in FIG. 9. First, as the lower layer of a "root" directory, any number, within a prescribed limit, of "folder" directories are made. The "folder" directory is made corresponding to the genre to which the contents belong, or to the owner user of the contents.

As the lower layer of the "folder" directory, any number, within a prescribed limit, of "album" directories are made, and the "album" directory corresponds to each of the album titles, for example. As the lower layer of the "album" directory, one or more "track" files which are arranged to belong to the "album" directory are stored, and a "track" file includes a musical composition, namely contents.

Such directory management of contents will be performed by a database file stored in the hard disk drive 34.

(1-4-3) Program Module Configuration

Figure 10:
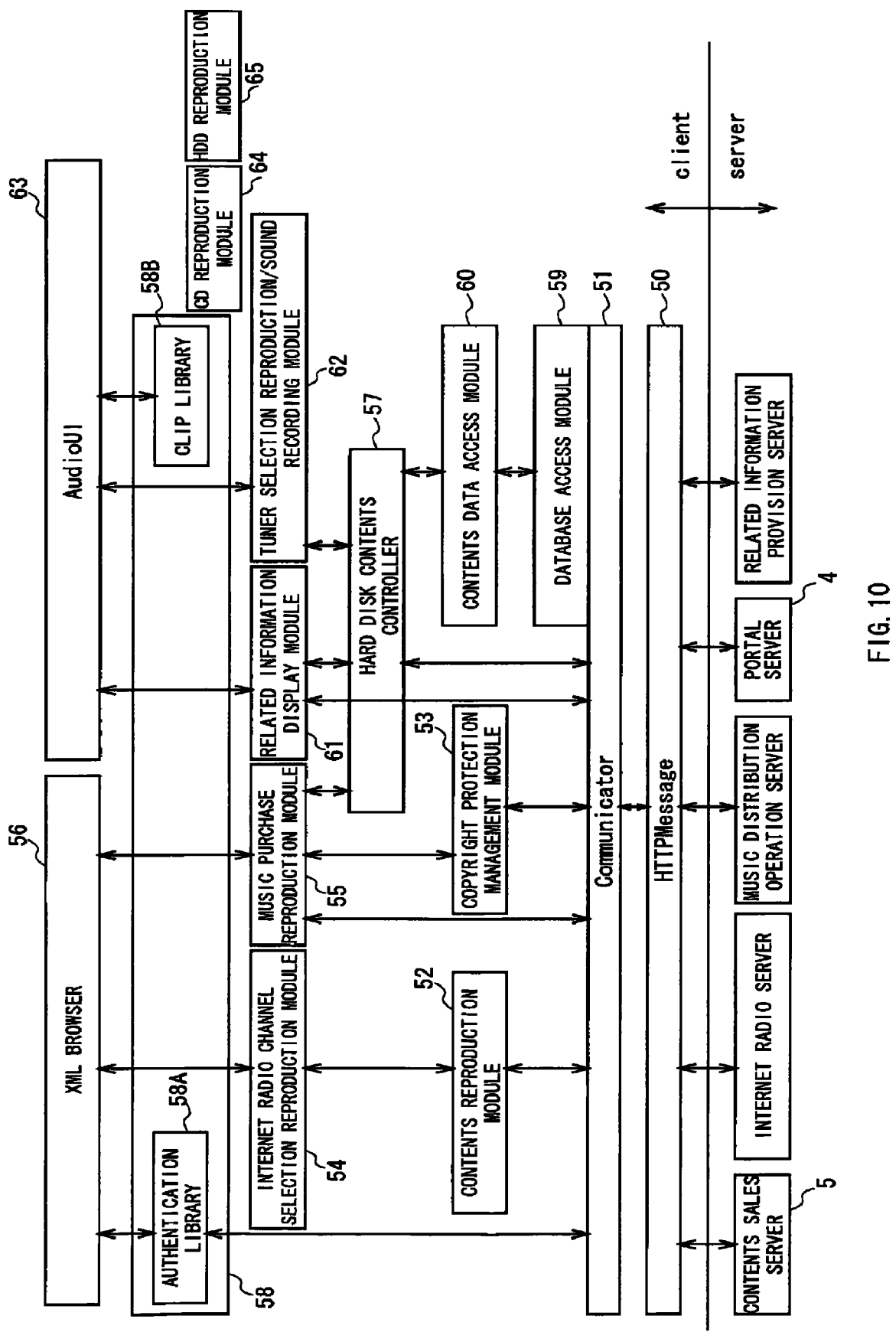
FIG. 10 is a schematic diagram showing a program module of the client terminal.

As shown in FIG. 10, a program module installed in the client terminal 2 operates on the OS. Concretely, the program module performs exchanges between the contents sales server 5 for selling a CD, the Internet radio server, a music distribution operation server, the portal server 4, a related information provision server, and other various servers, etc.

An HTTP (Hyper Text Transfer Protocol) message program 50 performs exchanges between various servers such as the contents sales server 5 and the portal server 4 by means of HTTP communication. A communicator program 51 is a program module for performing data exchange with the HTTP message program 50.

As the upper layer of the communicator program 51, a contents reproduction module 52 which interprets the CODEC (COmpression/DECompression) of contents and reproduces the contents, and a copyright protection information management module 53 which deals with information about the copyright protection, are arranged. For the contents reproduction module 52 and the copyright protection management module 53, an Internet radio channel selection reproduction module 54 which performs the channel selection and reproduction of the Internet radio, and a music purchase reproduction module 55 which performs the purchase of a music and the reproduction of a trial music are arranged respectively.

An XML browser 56, which is arranged as the upper layer of the Internet radio channel selection reproduction module 54 and the music purchase reproduction module 55, interprets a source described in a language such as XML and HTML (Hyper Text Markup Language) and displays, based on the result, an Web page (hereinafter, this is also simply referred to as a page) in the display section 37.

For example, a musical composition selected by the user via, the XML browser 56 is purchased in the music purchase reproduction module 55, so as to be written in the hard disk drive 34 via a hard disk contents controller 57.

Note that, the communicator program 51 is connected with an authentication library 58A in a library 58, and the authentication library 58A performs authentication processing or the like with the portal server.

Further, a database access module 59, a contents data access module 60, and the hard disk contents controller 57 are arranged in the upper layer of the communicator program 51.

The database access module 59 accesses various databases built in the hard disk drive 34. The contents data access module 60 accesses contents data stored in the hard disk drive 34. And the hard disk contents controller 57 manages the contents data stored in the hard disk drive 34.

As the upper layer of the hard disk contents controller 57, there are arranged a related information display module 61 for displaying the title and artist name or the like of a musical composition broadcasted by the radio station, and a tuner channel selection reproduction/sound recording module 62 for selecting the radio station and recording the contents of a musical composition received from the radio station on the hard disk drive 34.

For example, the musical composition received from the radio station selected by way of an audio user interface 63 is written in the hard disk drive 34 via the contents data access module 60.

The related information display module 61, according to the tuner channel selection reproduction/sound recording module 62, receives related information including a title and artist name or the like of a musical composition currently broadcasted by the radio station, from the related information distribution server by way of the HTTP message program 50, and displays the related information in the display section 37 via the audio user interface (UI) 63.

The related information displayed in the display section 37 via the audio user interface 63 can also be temporarily stored in a clip library 58B in the library 58, and is finally stored in the hard disk drive 34 via the database access module 59, in accordance with user's instructions.

Further, as the program modules of the client terminal 2, a CD reproduction module 64 for reproducing a CD, and an HDD reproduction module 65 for reproducing the hard disk drive 34 are included, and the reproduction result will be outputted sequentially through the audio data processing section 40 and the speaker 41.

(1-5) Page Display Processing Procedure

A processing procedure for finally displaying various pages such as an A Corporation CD sales page supplied from the contents sales server 5 in the display section 37 of the client terminal 2 (hereinafter, this is referred to as a page display processing procedure) will be described below.

(1-5-1) Display of A Corporation CD Sales Page Via Top Page

If the button BT1 in the top page shown in FIG. 3 is selected, in response thereto, the client terminal 2 of this embodiment displays an A Corporation CD sales page. Here, the page display processing procedure in this case will be described by using sequence charts shown in FIGS. 11 and 12.

Figure 11:
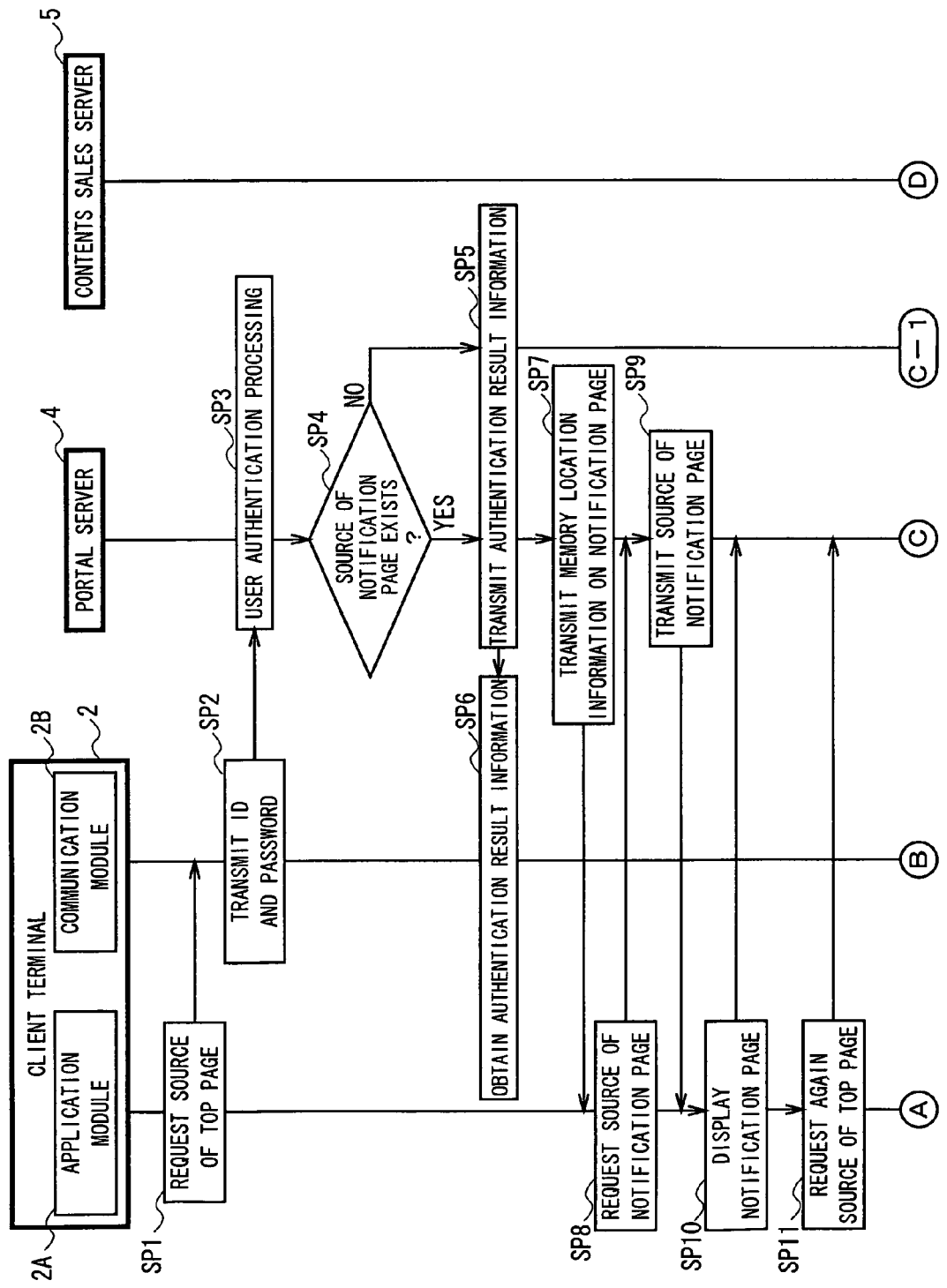
FIG. 11 is a sequence chart showing a page display processing procedure (1).
Figure 12:
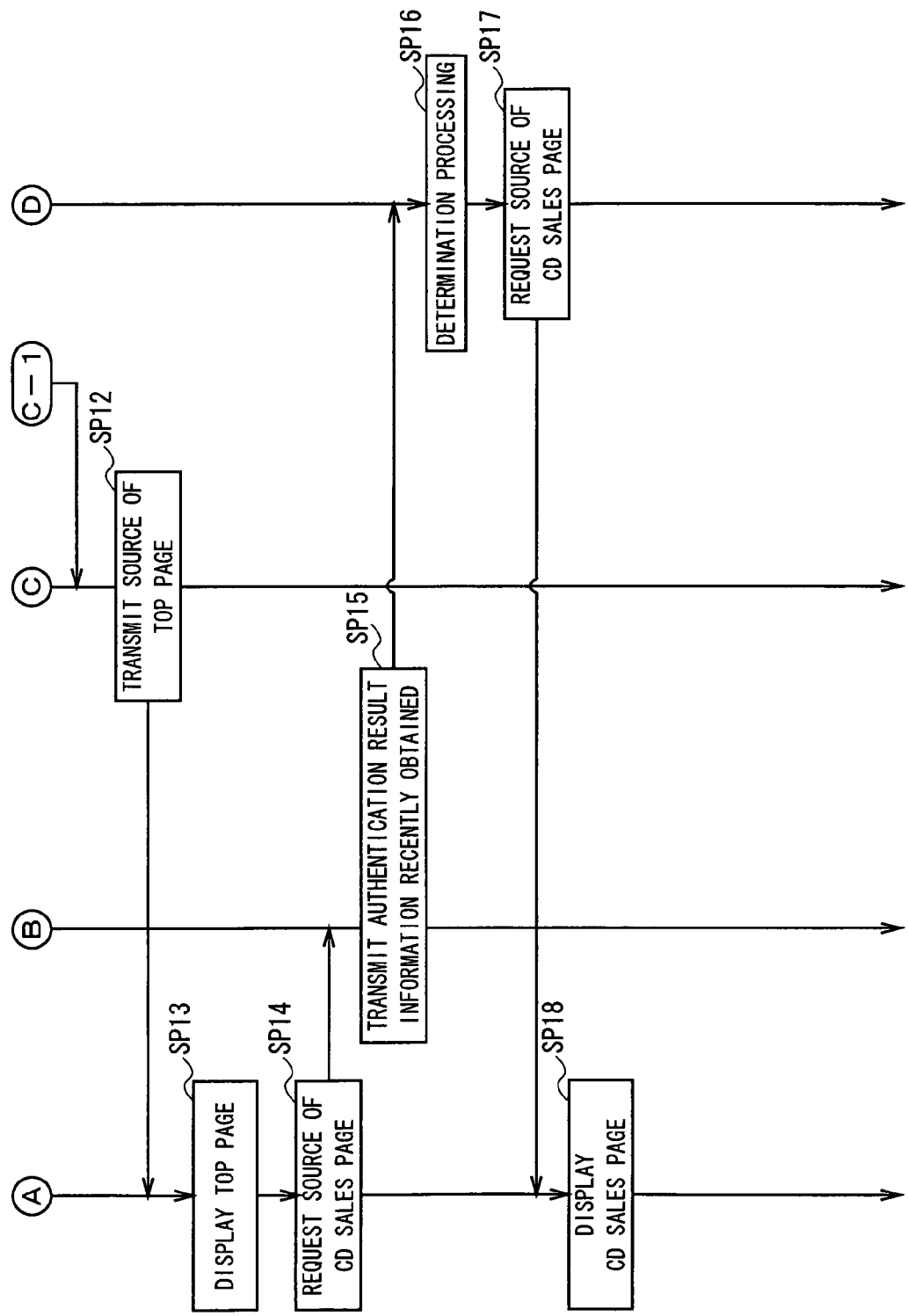
FIG. 12 is a sequence chart showing a page display processing procedure (2).

In FIGS. 11 and 12, and in FIGS. 14, 15, and 16 which will be described later, an application module 2A and a communication module 2B in the client terminal 2 are shown specifically. The application module 2A corresponds to the aforementioned XML browser 56 or the like and the communication module 2B corresponds to the aforementioned communicator program 51 or the like. The application module 2A exchanges the command and data at the application level with the portal server 4 and the contents sales server 5 via the communication module 2B being the lower layer of the application module 2A.

In the following description, for the convenience of description, the application module 2A and the communication module 2B in the client terminal 2 will be mainly described. However, needless to say, practically, the CPU 30 of the client terminal 2 performs various processing in accordance with the application module 2A and the communication module 2B.

If recognizing the operation for displaying the top page in the display section 37, the application module 2A of the client terminal 2 delivers a request signal for requesting the source of the top page (hereinafter, this is referred to as a first request signal) to the communication module 2B, and then proceeds to step SP2.

In step SP2, the communication module 2B of the client terminal 2 transmits the user's ID and password to the portal server 4 together with the first request signal delivered from the application module 2A.

If receiving the above user's ID and password together with the first request signal from the client terminal 2, in step SP3, the control section 10 of the portal server 4 performs user authentication processing based on the user's ID and password. Then, as a result of the user authentication processing, the user can be authenticated as the registered user, and the control section 10 of the portal server 4 generates authentication result information that indicates the authentication result and the authentication completion time. If completing the generation, the control section 10 of the portal server 4 proceeds to the next step SP4 to determine whether or not the source of a notification page has been stored in a predetermined memory location in the hard disk drive 12.

In the case of this embodiment, this notification page will be suitably created by the operator who operates the contents providing system, and for example, maintenance information on the portal server 4 or the like will be described therein.

If an affirmative result is obtained in step SP4, it means that the source of the notification page created by the operator has been stored in the predetermined memory location in the hard disk drive 12. Then, the control section 10 of the portal server 4 proceeds to step SP5, and transmits the authentication result information generated in step SP3 to the client terminal 2 so as to make the communication module 2B of the client terminal 2 obtain the authentication result information (step SP6), and then proceeds to step SP7 to transmit memory location information (for example, a path, URL or the like) indicating the memory location of the source of the notification page, to the client terminal 2.

If the memory location information transmitted from the portal server 4 is received via the communication module 2B, the application module 2A in the client terminal 2 proceeds to step SP8, and generates, based on the memory location information, a request signal for requesting the transmission of the source of the notification page (hereinafter, this is referred to as a notification page request signal), and transmits the request signal to the portal server 4 via the communication module 2B.

The control section 10 of the portal server 4 which has received the notification page request signal proceeds to step SP9, and reads the source of the notification page from the predetermined memory location in the hard disk drive 12, and transmits the source to the client terminal 2.

Figure 13:
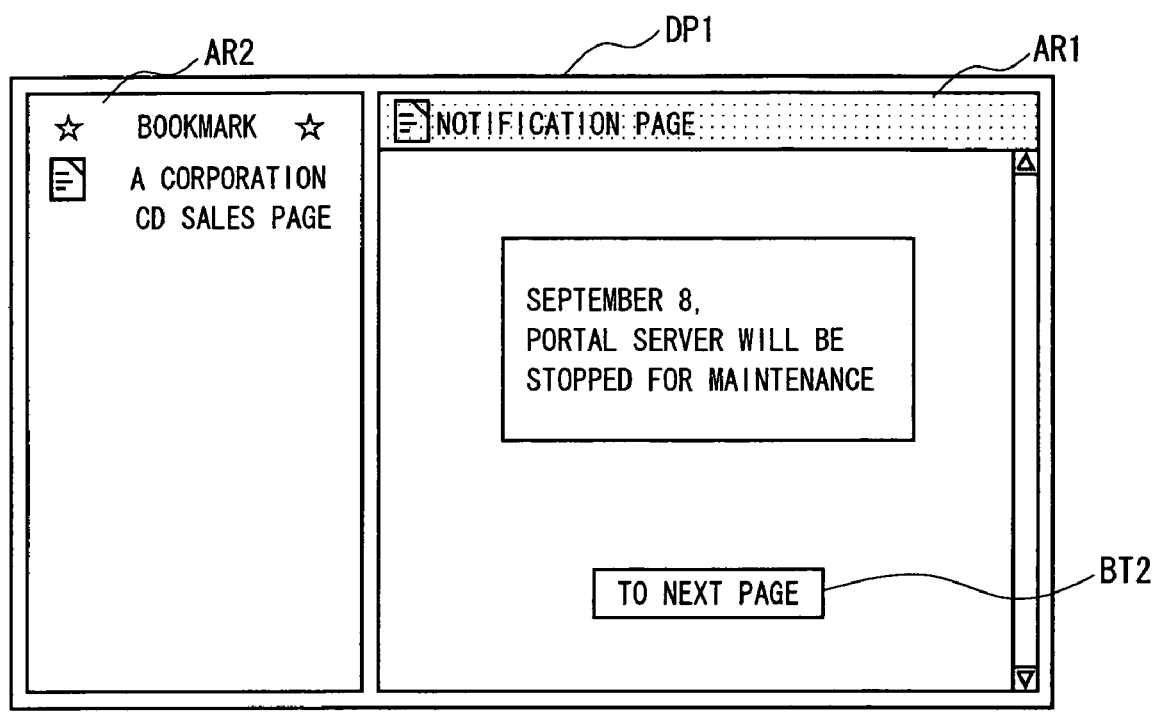
FIG. 13 is a schematic diagram showing a basic picture (5).

If the source of the notification page transmitted from the portal server 4 is received via the communication module 2B, the application module 2A in the client terminal 2 proceeds to step SP10 to display the notification page such as shown in FIG. 13, in a page display area AR1 based on the source. In the notification page, the maintenance information about the portal server 4, and the button BT2 to display the top page are displayed.

In this manner, in the contents sales system 1, information about server maintenance or the like that the user should be informed, can be forcibly notified via the notification page from the portal server 4 side.

Then, if the button BT2 in the notification page is selected by the user's operation, the application module 2A of the client terminal 2A proceeds to the next step SP11, and transmits again the first request signal for requesting the transmission of the source of the top page, to the portal server 4 via the communication module 2B.

Then, if receiving the first request signal again, the control section 10 of the portal server 4 proceeds to step SP12 (FIG. 12), and reads the source of the top page from the hard disk drive 12, and transmits the source to the client terminal 2.

If the source of the top page transmitted from the portal server 4 is received via the communication module 2B, the application module 2A of the client terminal 2 proceeds to step SP13 to display the top page (FIG. 3) based on the source.

Then, for example, if the button BT1 in the top page is selected by the user's operation, the application module 2A of the client terminal 2 proceeds to step SP14, and delivers a request signal for requesting the A Corporation CD sales page (hereinafter, this is referred to as a second request signal) to the communication module 2B.

In step 15, the communication module 2B transmits the authentication result information obtained in step SP6 together with the second request signal, to the contents sales server 5 storing the source of the A Corporation CD sales page.

If receiving the second request signal and the authentication result information from the client terminal 2, the control section 20 of the contents sales server 5 proceeds to step SP16 and refers to the authentication completion time or the like in the authentication result information, and determines whether or not the user of the client terminal 2 has recently been authenticated (for example, within past one minute) as the registered user. As a result of the determination, for example, if recognizing that the user of the client terminal 2 has recently been authenticated as the registered user, the control section 20 of the contents sales server 5 proceeds to step SP17 and transmits the source of the A Corporation CD sales page in accordance with the second request signal, to the client terminal 2.

If the source of the A Corporation CD sales page transmitted from the contents sales server 5 is received via the communication module 2B, the application module 2A of the client terminal 2 proceeds to step SP18 to display the A Corporation CD sales page (FIG. 5) based on the source.

As the above, in the contents sales system 1, despite the fact that the source of the top page has been requested from the client terminal 2, if the source of the notification page describing the information to be notified to the user exists in the portal server 4 side, the portal server 4 preferentially transmits the source of the notification page to the client terminal 2 before the source of the top page is transmitted.

Accordingly, the notification page is preferentially displayed than the top page in the display section 37 of the client terminal 2, so that the operator of the contents sales system 1 can surely notify the user of the information to be notified to the user, by the use of the above notification page.

In this connection, if a negative result is obtained in the aforementioned step SP4, this means that the source of the notification page does not exist in a predetermined memory location in the hard disk drive 12. The control section 10 of the portal server 4 proceeds to step SP5 and transmits the authentication result information generated in step SP3 to the client terminal 2, so as to make the communication module 2B of the client terminal 2 obtain the authentication result information (step SP6), and then proceeds to step SP12 (FIG. 12) to transmit the source of the top page to the client terminal 2 in accordance with the first request signal.

(1-5-2) Display of A Corporation CD Sales Page from Bookmark

For example, if title information "A Corporation CD sales page" displayed in the bookmark display area AR2 shown in FIG. 5 is selected, the client terminal 2 of this embodiment displays the A Corporation CD sales page in response thereto. Here, the page display processing procedure in this case will be described by using sequence charts shown in FIGS. 14, 15, and 16.

For example, if that the title information "A Corporation CD sales page" displayed in the bookmark display area AR2 was selected is recognized, by the user's operation, the application module 2A of the client terminal 2 proceeds to step SP21 to generate the second request signal for requesting the source of the A Corporation CD sales page based on the URL that has been stored in correspondence with the title information "A Corporation CD sales page", and deliver the second request signal to the communication module 2B, and proceeds to step SP22.

In step SP22, the communication module 2B of the client terminal 2 transmits for example the authentication result information obtained from the portal server 4 one hour before, together with the second request signal delivered from the application module 2A, to the contents sales server 5 storing the source of the A Corporation CD sales page.

If receiving the second request signal and the authentication result information from the client terminal 2, the control section 20 of the contents sales server 5 proceeds to step SP23 and refers to the authentication completion time (in this case, the time approximately one hour before) or the like in the authentication result information, and determines whether or not the user of the client terminal 2 has recently been authenticated (for example, within past one minute) as the registered user. As a result of the determination, if that the user of the client terminal 2 has not recently been authenticated as the registered user is recognized, the control section 20 of the contents sales server 5 proceeds to step SP24 to generate a request rejection signal for rejecting the second request signal from the client terminal 2, and transmit the request rejection signal to the client terminal 2.

If the rejection of the request to the contents sales server 5 is recognized based on the request rejection signal transmitted from the contents sales server 5, the communication module 2B of the client terminal 2 proceeds to step SP25 to transmit the user's ID and password to the portal server 4.

If receiving the user's ID and password from the client terminal 2, the control section 10 of the portal server 4 proceeds to step SP26 to perform user authentication processing based on the user's ID and password. As a result of the user authentication processing, if the user can be authenticated as the registered user and authentication result information that indicates the authentication result and the authentication completion time is generated, the control section 10 of the portal server 4 confirms whether or not the source of the notification page exists in a predetermined memory location in the hard disk drive 12.

Here, if the presence of the source of the notification page in the predetermined memory location is confirmed, the control section 10 of the portal server 4 proceeds to step SP40 in FIG. 16 (that will be described later). Or if the absence of the source of the notification page in the predetermined memory location is confirmed, the control section 10 of the portal server 4 proceeds to step SP27 in FIG. 15.

Figure 15:
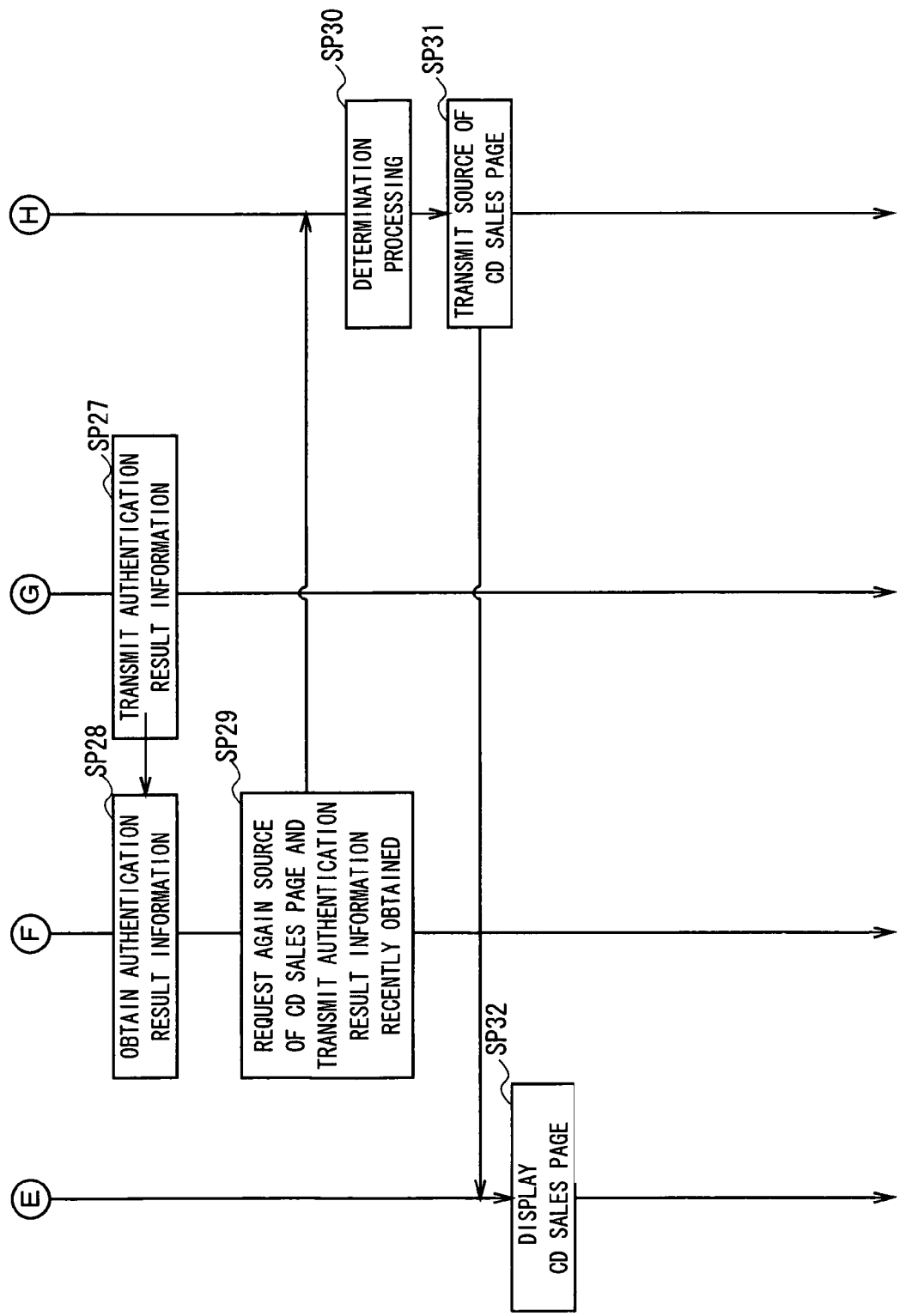
FIG. 15 is a sequence chart showing a page display processing procedure (4).

In step SP27 in FIG. 15, the control section 10 of the portal server 4 transmits the generated authentication result information to the client terminal 2, so as to make the communication module 2B of the client terminal 2 obtain the authentication result information (step SP28).

The communication module 2B of the client terminal 2 proceeds to step SP29 to transmit again the latest authentication result information obtained in step SP28 together with the second request signal for requiring the source of the A Corporation CD sales page, to the contents sales server 5.

If receiving the second request signal and the latest authentication result information from the client terminal 2, the control section 20 of the contents sales server 5 proceeds to step SP30 to refer to the authentication completion time or the like in the authentication result information, and determine whether or not the user of the client terminal 2 has recently been authenticated as the registered user. As a result of the determination, if that the user of the client terminal 2 has recently been authenticated as the registered user is recognized, the control section 20 of the contents sales server 5 proceeds to step SP31 to receive the second request signal from the client terminal 2, and transmit the source of the A Corporation CD sales page to the client terminal 2.

If the source of the A Corporation CD sales page transmitted from the contents sales server 5 is received via the communication module 2B, the application module 2A of the client terminal 2 proceeds to step SP32 to display the A Corporation CD sales page (FIG. 5) based on the above source.

In this manner, the contents sales server 5 receives only the request made by the client terminal 2 of the user who has been authenticated as the registered user (the second request signal) within a predetermined period (here, within past one minute).

In the client terminal 2, the communication module 2B performs the processing for making the portal server 4 authenticate the user of the client terminal 2 as the registered user (steps SP25, SP28 or the like), and the processing for making the contents sales server 5 accept the request based on the authentication result information obtained as a result of the above authentication (steps SP21, SP29 or the like), by itself.

Therefore, the application module 2A of the client terminal 2 can be dedicated to the processing peculiar to the application (steps SP21 and SP32).

As a result, the construction of the application module 2A operating in the upper layer of the communication module 2B can be significantly simplified.

Figure 14:
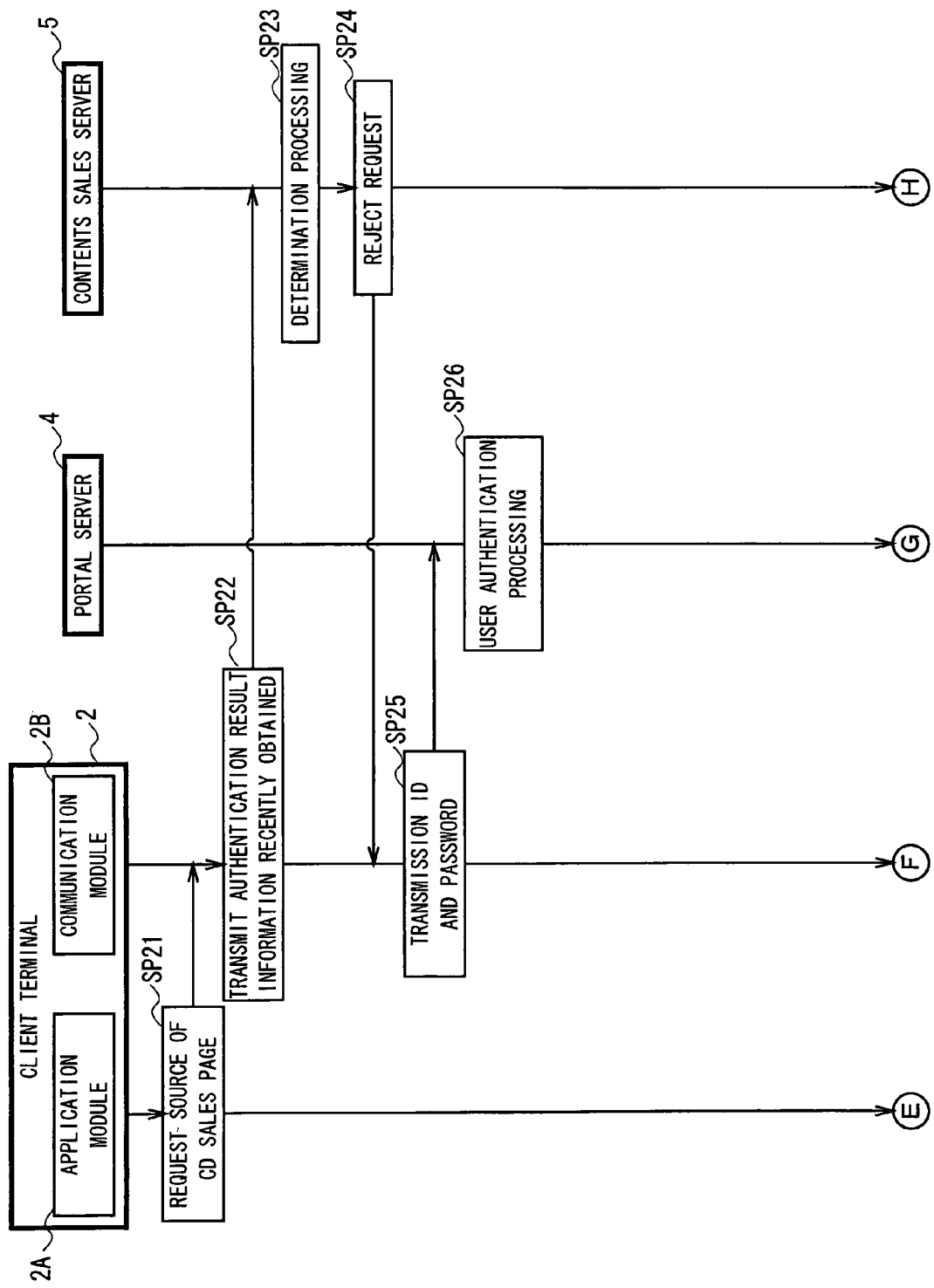
FIG. 14 is a sequence chart showing a page display processing procedure (3).
Figure 16:
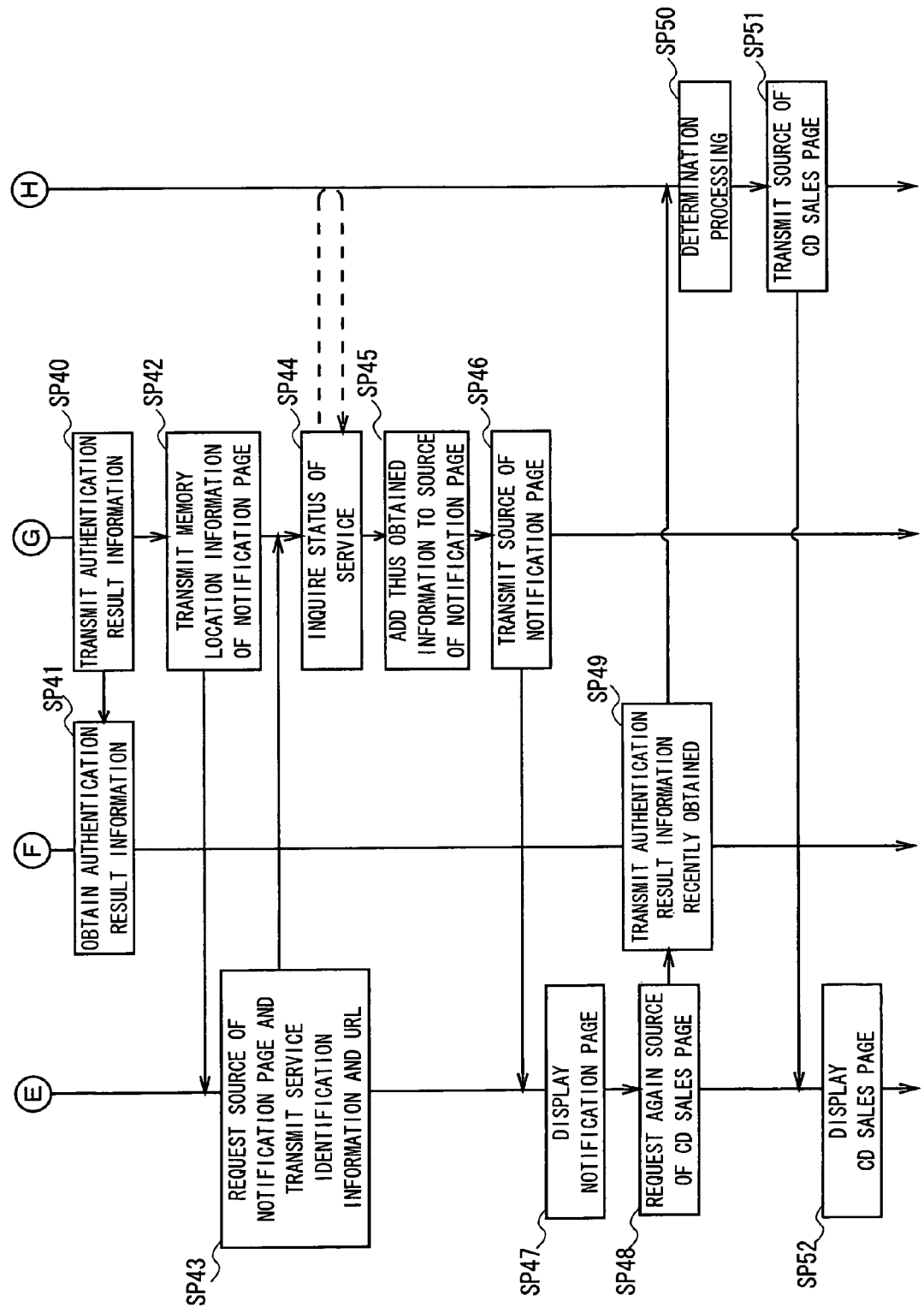
FIG. 16 is a sequence chart showing a page display processing procedure (5).

Next, there is described the case where the control section 10 of the portal server 4 proceeds to step SP40 in FIG. 16, after that the source of the notification page exists in the predetermined memory location in the hard disk drive 12 was confirmed in the aforementioned step SP26 (FIG. 14).

Specifically, in this step SP40, the control section 10 of the portal server 4 transmits the generated authentication result information to the client terminal 2, and makes the communication module 2B of the client terminal 2 obtain the authentication result information (step SP41). In the next step SP42, the control section 10 of the portal server 4 transmits the memory location information indicating the memory location of the source of the notification page to the client terminal 2.

If the memory location information transmitted from the portal server 4 is received via the communication module 2B, the application module 2A of the client terminal 2 proceeds to step SP43 to generate a notification page request signal for requesting the transmission of the source of the notification page based on the memory location information, and transmits the notification page request signal to the portal server 4 via the communication module 2B.

At the same time, the application module 2A also transmits service identification information and the URL of the A Corporation CD sales page that were stored at the time of performing the bookmark of the A Corporation CD sales page, to the portal server 4. As described above, the service identification information indicates that the A Corporation CD sales page is a page intended for providing CD sales service.

If receiving the service identification information and the URL of the A Corporation CD sales page together with the notification page request signal from the client terminal 2, in step SP44, the control section 10 of the portal server 4 makes an inquiry about the current availability of the CD sales service in the contents sales server 5 indicated by the above service identification information, to the contents sales server 5.

Figure 17:
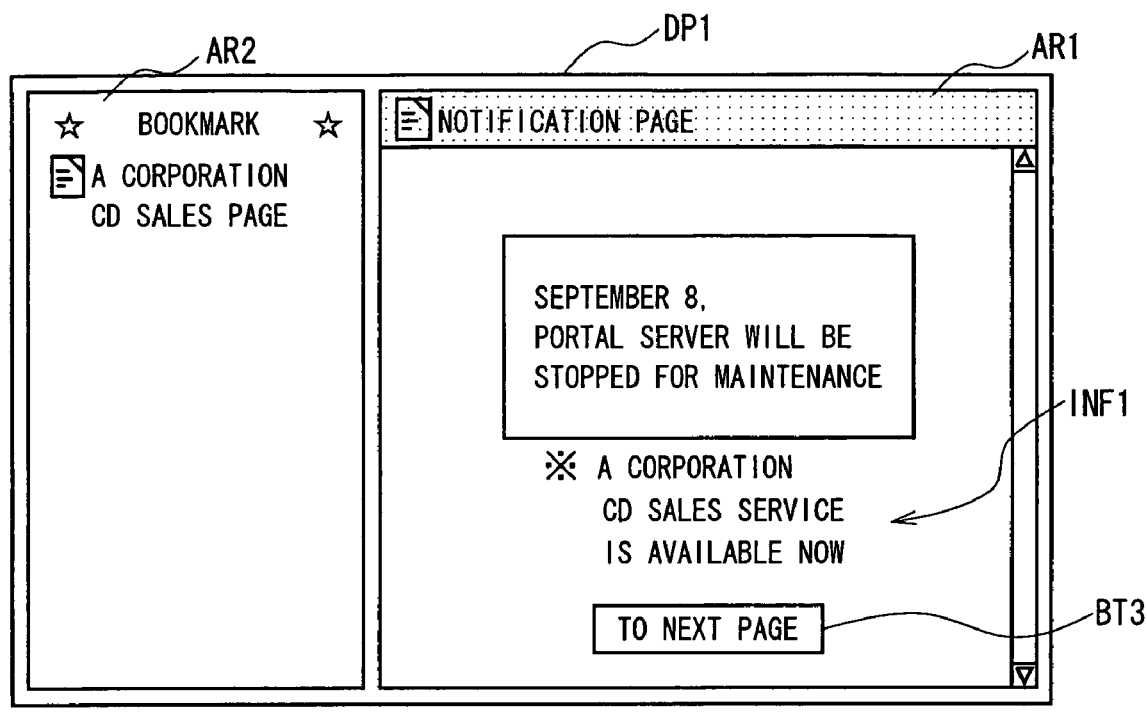
FIG. 17 is a schematic diagram showing a basic picture (6).

The control section 10 of the portal server 4 proceeds to step SP45 to add the above inquiry result and also the received URL of the A Corporation CD sales page to the source of the notification page, so as to generate the source for displaying a notification page such as shown in FIG. 17.

Then, the control section 10 of the portal server 4 proceeds to step SP46 to transmit the source of the notification page after the above addition to the client terminal 2, in accordance with the received notification page request signal.

If the source of the notification page after the above addition is received via the communication module 2B, the application module 2A of the client terminal 2 displays the notification page (FIG. 17) in step SP47.

This notification page also indicates current status information INF1 representing the current status of the CD sales service inquired by the portal server 4 to the contents sales server 5 based on the service identification information from the client terminal 2. This current status information INF1 indicates that the CD sales service in the contents sales server 5 is currently available, or that the CD sales service is in pause, or the like.

This enable the client terminal 2 to notify the current status of the CD sales service of the user by way of the notification page, before displaying the A Corporation CD sales page for the use of the CD sales service.

Since a button BT3 in the notification page is linked to the URL of the A Corporation CD sales page, for example, if the button BT3 is selected by the user's operation, the application module 2A of the client terminal 2 proceeds to step SP48 to generate the second request signal for requesting the source of the A Corporation CD sales page based on the above URL, and deliver the request signal to the communication module 2B.

In step SP49, the communication module 2B transmits the latest authentication result information obtained in step SP41 together with the delivered second request signal, to the contents sales server 5.

If receiving the second request signal and the latest authentication result information from the client terminal 2, in step SP50, the control section 20 of the contents sales server 5 refers to the authentication completion time or the like in the authentication result information, and determines whether or not the user of the client terminal 2 has been recently authenticated (for example, within past one minute) as the registered user. For example, as a result, if that the user of the client terminal 2 has recently been authenticated as the registered user is recognized, the control section 20 of the contents sales server 5 proceeds to step SP51 to accept the second request signal from the client terminal 2, and transmit the source of the A Corporation CD sales page to the above client terminal 2.

If the source of the A Corporation CD sales page transmitted from the contents sales server 5 is received via the communication module 2B, the application module 2A of the client terminal 2 displays the A Corporation CD sales page (FIG. 5) in step SP52 based on the above source.

Thus, in the contents sales system 1, even if an operation to display the A Corporation CD sales page using a bookmark is performed, in the case where the source of the notification page exists in the portal server 4, the notification page is preferentially displayed in the display section 37 of the client terminal 2 than the A Corporation CD sales page.

Therefore, the operator of the contents sales system 1 can surely notify the user of information to be notified to the user, by utilizing the above notification page.

(1-6) Operation and Effects

According to the above configuration, even if the case where the first request signal for requesting the source of the top page or the second request signal for requesting the source of the A Corporation CD sales page was transmitted from the client terminal 2, provided that the portal server 4 has stored the source of the notification page, the source of the notification page is transmitted from the portal server 4 to the client terminal 2, before the source of the top page is transmitted from the portal server 4 or the source of the A Corporation CD sales page is transmitted from the contents sales server 5.

Thus, in the display section 37 of the client terminal 2, the notification page is preferentially displayed than the top page and the A Corporation CD sales page. Therefore, the operator of the contents sales system 1 can surely notify the user of information to be notified to the user, by utilizing the notification page.

According to the above configuration, the client terminal 2 can preferentially display the notification page than the top page and the A Corporation CD sales page. As a result, maintenance information or the like can be surely notified to the user.

(2) Second Embodiment

Next, another example of the contents sales system in which the system according to the present invention is adopted, will be described as a second embodiment.

Figure 18:
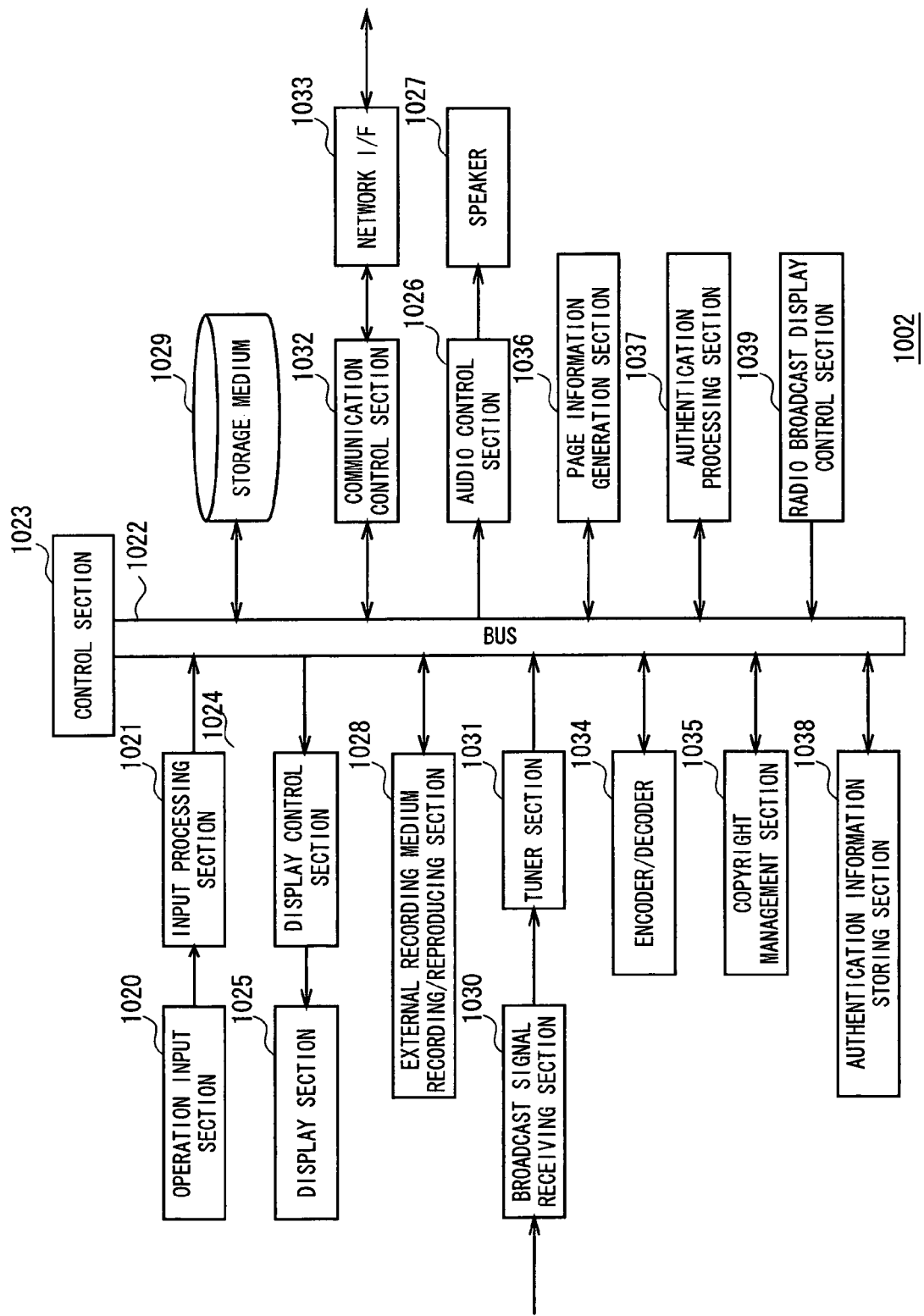
FIG. 18 is a block diagram showing the hardware configuration, illustrated by functional circuit blocks, of a client terminal in a second embodiment according to the present invention.
Figure 19:
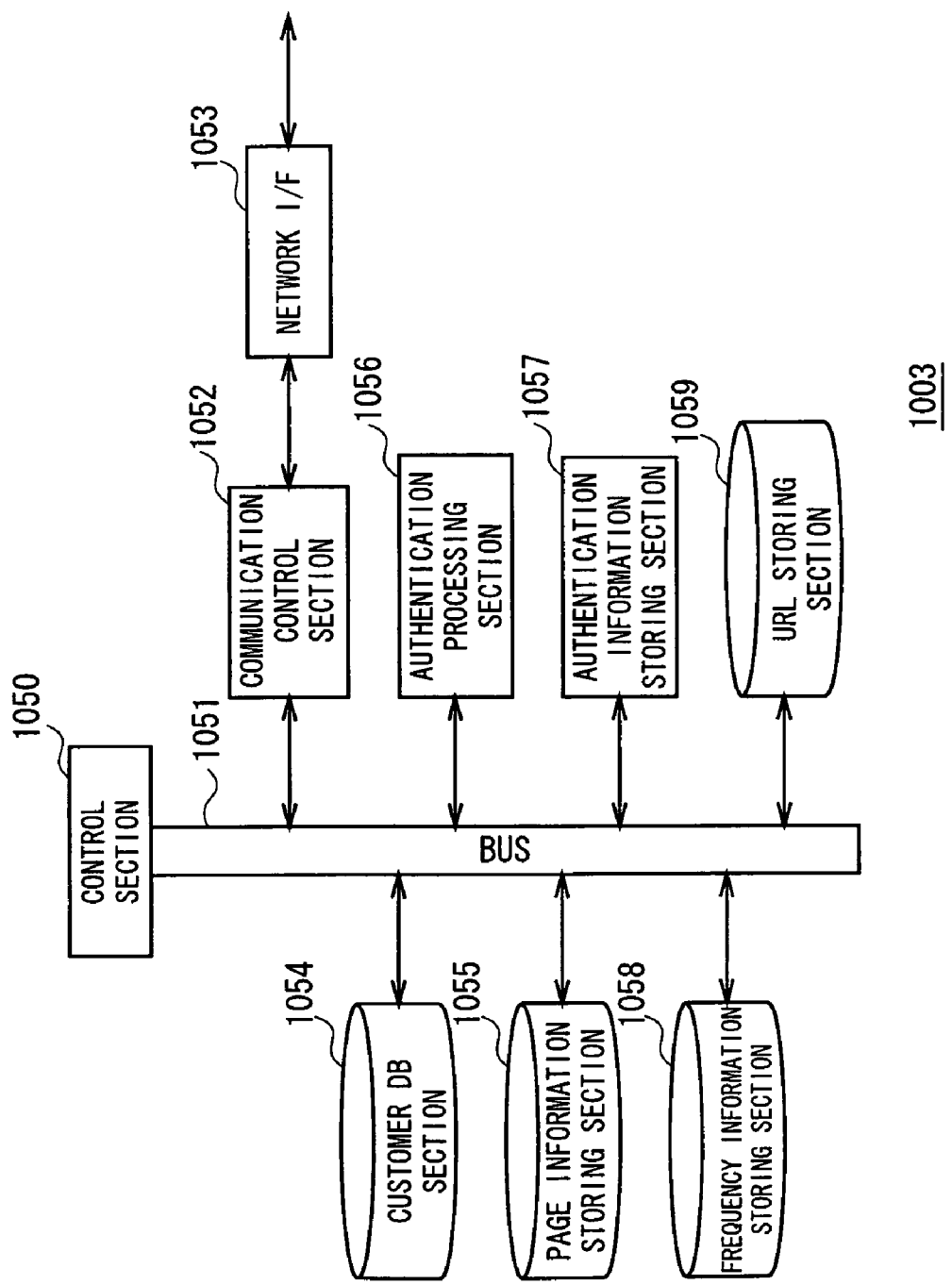
FIG. 19 is a block diagram showing the hardware configuration, illustrated by functional circuit blocks, of a portal server.
Figure 20:
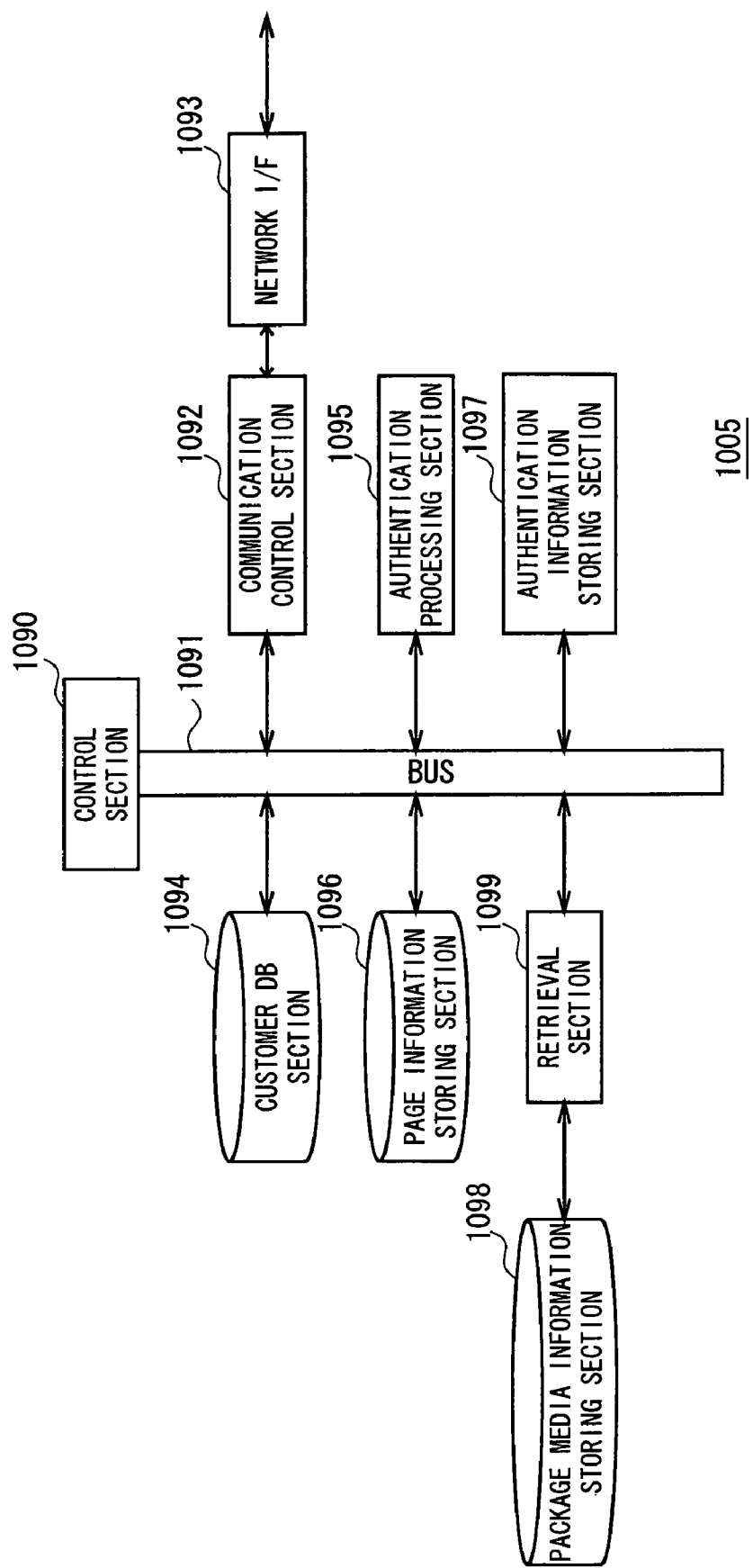
FIG. 20 is a block diagram showing the hardware configuration, illustrated by functional circuit blocks, of a contents sales server.

A client terminal 1002 in FIG. 18 in the second embodiment corresponds to the client terminal 2 in FIG. 1 in the first embodiment describe above, a portal server 1003 in FIG. 19 corresponds to the portal server 4 in FIG. 1, and a contents sales server 1005 in FIG. 20 corresponds to the contents sales server 5 in FIG. 1.

(2-1) Functional Circuit Block Configuration of Client Terminal

The hardware configuration of the client terminal 1002 represented by a functional circuit block will be described first. As shown in FIG. 18, if an operation input section 1020 composed of various operation buttons formed on the casing surface and the remote controller (not shown) is operated by the user, the client terminal 1002 recognizes the operation through the operation input section 1020, and transmits a control input signal according to the operation to an input processing section 1021.

The input processing section 1021 converts the control input signal supplied from the operation input section 1020 into a specific operation command, and transmits it to a control section 1023 by way of a bus 1022.

The control section 1023 controls the operation of each circuit, based on the operation command and the control signal that are supplied from each circuit connected by way of the bus 1022.

A display control section 1024 performs digital/analog conversion processing to video data supplied via the bus 1022, and transmits thus obtained analog video signal to a display section 1025.

For example, the display section 1025 is a display device such as a liquid crystal display that may be directly attached to the casing surface or externally provided.

If a processing result by the control section 1023 and various video data are supplied as analog video signals via the display control section 1024, the display section 1025 displays images based on the analog video signals.

An audio control section 1026 performs digital/analog conversion processing to audio data supplied via the bus 1022, and transmits thus obtained analog audio signal to a speaker 1027. The speaker 1027 emits a sound based on the analog sound signal supplied from the audio control section 1026.

An external-recording-medium recording/reproducing part 1028 is a recording/reproducing part that reads and reproduces contents data recorded in an external recording medium such as a CD and a memory stick (registered trademark) with a flash memory included in the outer package case, or records contents data to be recorded in the external recording medium.

If video data is read from an external recording medium as contents data, the external-recording-medium recording/reproducing part 1028 supplies the read video data to the display control section 1024 by way of the bus 1022.

Thereby, the display control section 1024 converts the video data read from the external recording medium as the contents data by the external-recording-medium recording/reproducing part 1028 into an analog video signal, and supplies this signal to the display section 1025.

If audio data is read from an external recording medium as contents data, the external-recording-medium recording/reproducing part 1028 supplies the read audio data to the audio control section 1026 by way of the bus 1022.

Thereby, the audio control section 1026 converts the voice data read from the external recording medium as the contents data by the external-recording-medium recording/reproducing part 1028 into an analog audio signal, and supplies this signal to the speaker 1027.

Furthermore, the control section 1023 can transmit the contents data read from the external recording medium by the external-recording-medium recording/reproducing part 1028 to a storage medium 1029 in the client terminal 1002 via the bus 1022, and can store the contents data in the storage medium 1029 (hereinafter, such storing of contents data in the storage medium 1029 is also referred to as ripping).

When video data such as picture data or motion picture data is read from the storage medium 1029 as contents data, the control section 1023 supplies the read video data to the display control section 1024 via the bus 1022.

When audio data such as sound data from the storage medium 1029 as contents data, the control section 1023 supplies the read audio data to the audio control section 1026 via the bus 1022.

In addition, the control section 1023 also can read music data from the storage medium 1029 and can transmit the data to the external-recording-medium recording/reproducing section 1028. Thereby, that music data can be recorded in an external recording medium by the above external-recording-medium recording/reproducing section 1028.

A broadcast signal receiving section 1030 receives radio broadcast waves transmitted from each radio station, and supplies them to a tuner section 1031.

Under the control of the control section 1023, the tuner section 1031 extracts for example a radio broadcast signal at a broadcast frequency corresponding to the radio station that was specified via the operation input section 1020, out of the radio broadcast waves received via the broadcast signal receiving section 1030, performs predetermined receiving processing to the extracted radio broadcast signal and transmits thus obtained audio data to the audio control section 1026 via the bus 1022.

The audio control section 1026 converts the audio data Supplied from the tuner section 1031 into an analog audio signal and transmits this signal to the speaker 1027, so that the speaker 1027 emits the sound of the radio program being broadcasted by the radio station. Thus, the user can listen to the sound of the radio program.

The control section 1023 also can transmit and store the audio data obtained in the tuner section 1031 to/in the storage medium 1029, so that the sound of the radio program can be recorded.

Further, the control section 1023 can be connected to a predetermined network sequentially via a communication control section 1032 and a network interface 1033, and can access the portal server 1003, the contents sales server 1005 or the like on the above network. Thereby, various information and various data can be transmitted/received to/from these portal server 1003, the contents sales server 1005, and the like.

An encoder/decoder section 1034 decodes comparatively-coded contents data received from the network sequentially via the network interface 1033 and the communication control section 1032, or compressively-coded contents data read from the storage medium 1029 and an external recording medium, and transmits the decoded data to the display control section 1024 and the audio control section 1026.

Further, the encoder/decoder section 1034 compressively codes contents data read from an external recording medium, that is not compressively coded, the audio data supplied from the tuner section 1031, or the like, and transmits the above compressively-coded contents data to the storage medium 1029.

Thereby, the contents data compressively coded in the encoder/decoder section 1034 is stored in the storage medium 1029 under the control of the control section 1023.

A copyright management section 1035 generates copyright management information corresponding to the contents data downloaded from the network sequentially via the network interface 1033 and the communication control section 1032, and copyright management information corresponding to the contents data read out from the external recording medium by the external recording medium recording/reproducing section 1028.

The copyright management information generated by the copyright management section 1035 is registered in the storage medium 1029 in association with the contents data, under the control of the control section 1023.

Furthermore, the copyright management section 1035 protects the copyright of the contents data by suitably updating the contents of the copyright management information associated with the above contents data, at the time of check-out and check-in of the contents data associated with the copyright management information between the storage medium 1029 and a specific external recording medium.

A page information generation section 1036 interprets page information being an XML (extensible Markup Language) file or an HTML (Hyper Text Markup language) file or the like, that is received from the network sequentially via the network interface 1033 and the communication control section 1032, generates video data for display in the display section 1025, and transmits thus generated video data to the display control section 1024.

An authentication processing section 1037 performs authentication processing such as the transmission of authentication information to the portal server 1003 and the contents sales server 1005 on the network connected via the network interface 1033, sequentially via the communication control section 1032 and the network interface 1033.

An authentication information storing section 1038 stores the authentication information that will be required when the authentication processing section 1037 accesses the portal server 1003, the contents sales server 1005, or the like.

A radio broadcast display control section 1039 transmits a request signal for requesting radio broadcast information about the radio broadcast being currently received by the user for listening, to a radio broadcast information distribution server (not shown) corresponding to the radio station that is broadcasting the radio broadcast being currently received, sequentially via the communication control section 1032 and the network interface 1033.

As a result, the radio broadcast display control section 1039 receives the radio broadcast information transmitted from the radio broadcast information distribution server on the network sequentially via the network interface 1033 and the communication control section 1032, and transmits the received radio broadcast information to the display control section 1024. Thereby, in the display section 1025, the radio broadcast information including the program title of the radio program being currently received, the title and the artist name of the musical composition being received, or the like (corresponding to the aforementioned related information) is displayed.

(2-2) Configuration of Portal Server

Next, the hardware configuration of the portal server 1003 represented by a functional circuit block will be described with reference to FIG. 19. A control section 1050 in the portal server 1003 controls the operation of each circuit connected via a bus 1051.

Under the control of the control section 1050, a communication control section 1052 transmits/receives various information to/from the client terminal 1002, the contents sales server 1005, or the like, via a network interface 1053.

In a customer database section 1054, user ID (Identification) information and password information about the user who has already completed a contract with the operator of the contents sales system, is registered as customer information so as to be associated with each other.

In a page information storing section 1055, page information managed by the operator of the contents sales system or the like has been stored.

Note that, this page information is described by a language such as XML, and includes URL (Uniform Resource Locator) information for accessing the contents sales server 1005 or the like.

If the user ID information and the password information transmitted from the client terminal 1002 is received sequentially via the network interface 1053 and the communication control section 1052, as user authentication processing, an authentication processing section 1056 confirms whether or not the received user ID information and password information has been registered in the customer database section 1054 as customer information.

If the user authentication processing is finished, the authentication processing section 1056 issues portal authentication result information indicating the result of the above user authentication processing (authentication session ID information that will be described later), and temporarily stores the issued portal authentication result information in an authentication information storing section 1057.

At this time, if the user is authenticated as the registered user as a result of the user authentication processing by the authentication processing section 1056, the control section 1050 transmits page information about a page for contractors (for example, the top page in the aforementioned first embodiment) stored in the page information storing section 1055 together with the portal authentication result information, to the client terminal 1002 sequentially via the communication control section 1052 and the network interface 1053.

Note that, when the user was not authenticated as the registered user as the result of the user authentication processing by the authentication processing section 1056, the control section 1050 may transmit authentication error information together with authentication failure notification page information indicating the authentication failure stored in the page information storing section 1055, to the client terminal 1002 sequentially via the communication control section 1052 and the network interface 1053.

As a result that the authentication processing of the user was performed by the contents sales server 1005 or the like, if portal, authentication result information obtained and transmitted from the client terminal 1002 of the above user (an authentication ticket described later) is received, sequentially via the network interface 1053 and the communication control section 1052, the authentication processing section 1056 compares the above received portal authentication result information with the portal authentication result information corresponding to the above user temporarily stored in the authentication information storing section 1057.

As authentication processing for the portal authentication result information received from the contents sales server 1005 or the like, the authentication processing section 1056 performs confirmation processing for confirming whether or not to be normal portal authentication result information, and replies in confirmation result information indicating the confirmation result to the above contents sales server 1005 or the like, sequentially via the communication control section 1052 and the network interface 1053.

In a frequency information storing section 1058, an area code such as a postal code number enabling to specify the area, frequency information indicating the broadcast frequency of radio broadcasts receivable in the area indicated by the area code, the names of radio stations broadcasting the radio broadcasts (hereinafter, this is referred to as radio station names), and call signs being identification information unique to each radio station, have been stored so as to be associated with each other.

In a URL storing section 1059, the call sign of each radio station for radio broadcast, and URL information enabling to obtain radio broadcast information that relates to the radio program being currently broadcasted by the radio station corresponding to the above call sign and includes the program title of the above radio program and the title of the musical composition being currently broadcasted in the radio program, have been stored so as to be associated with each other (hereinafter, this is especially referred to as now-on-air information).

(2-3) Functional Circuit Block Configuration of Contents Sales Server

Next, the hardware configuration of the contents sales server 1005 represented by a functional circuit block will be described with reference to FIG. 20. A control section 1090 in the contents sales server 1005 controls the operation of each circuit connected via a bus 1091.

Under the control of the control section 1090, a communication control section 1092 transmits/receives various information to/from the client terminal 1002, the portal server 1003 or the like, via a network interface 1093.

In a customer database section 1094, user ID information and password information about the user who has already completed a contract with the operator of the contents sales server 1005, is registered as customer information so as to be associated with each other. However, in the case where an authentication processing section 1095 is provided with a function to perform the authentication processing of the user based on portal authentication result information that has been issued by the portal server 1003 and is transmitted from the client terminal 1002, the customer database section 1094 may not be provided.

In a page information storing section 1096, page information about a package media sales page for introducing package media such as CDs and DVDs for sale that is managed by the contents sales server 1005 (for example, the aforementioned A Corporation CD sales page in the first embodiment), or the like has been stored.

In this connection, the page information about the package media sales page is described by a language such as the XML, and the user using the client terminal 1002 can select a package medium such as a CD and a DVD that he/she wishes to purchase.

If receiving a request signal for requesting the page information about the package media sales page transmitted from the client terminal 1002 sequentially via the network interface 1093 and the communication control section 1092, the control section 1090 transmits the page information about the package media sales page stored in the page information storing section 1096 to the client terminal 1002 sequentially via the communication control section 1092 and the network interface 1093, according to the received request signal.

If the user ID information and the password information about the user using the client terminal 1002 transmitted from the above client terminal 1002 sequentially via the network interface 1093 and the communication control section 1092 as user authentication processing, the authentication processing section 1095 confirms whether or not the above received user ID information and password information has been registered as customer information in the customer database section 1094.

Further, as a user authentication method different from the user authentication processing using the user ID information and the password information, the authentication processing section 1095 receives portal authentication result information that was issued by the portal server 1003 is transmitted from the client terminal 1002 (an authentication ticket described later), sequentially via the network interface 1093 and the communication control section 1092, and transmits the above received portal authentication result information to the portal server 1003 sequentially via the communication control section 1092 and the network interface 1093.

By the transmission of the portal authentication result information to the portal server 1003, the authentication processing of the portal authentication result information (namely, the aforementioned confirmation processing) is performed. As a result, confirmation result information is replied from the above portal server 1003. The authentication processing section 1095 receives this confirmation result information sequentially via the network interface 1093 and the communication control section 1092, and confirms whether or not the user is the registered user who has already completed the contract with the operator of the contents sales system, based on the above received confirmation result information.

If the user authentication processing is completed as the above, the authentication processing section 1095 issues server authentication result information indicating the result of that user authentication processing (service session ID information described later).

At this time, as the result of the user authentication processing by the authentication processing section 1095, if the user is authenticated as the registered user, the control section 1090 transmits the page information about the package media sales page that is intended for the contractor and has, been stored in the page information storing section 1096 together with the server authentication result information, to the client terminal 1002 sequentially via the communication control section 1092 and the network interface 1093.

On the contrary, as a result of the user authentication processing by the authentication processing section 1095, if the user was not authenticated as the registered user, the control section 1090 transmits authentication error information together with authentication failure notification page information indicating the failure of the authentication that has been stored in the page information storing section 1096, to the client terminal 1002 sequentially via the communication control section 1092 and the network interface 1093.

By the way, in an authentication information storing section 1097, the server authentication result information issued by the authentication processing section 1095 is temporarily stored, and also various authentication information which is required when the authentication processing section 1095 performs user authentication processing of the user using the client terminal 1002 has been stored.

In a package media information storing section 1098, information about a plurality of package media such as CDs and DVDs for sale (hereinafter, this is referred to as package media information) has been stored, in association with the search key of each package media ID information or the like.

If a media information request signal for requesting package media information about a package medium such as a specific CD or DVD that is transmitted from the client terminal 1002 as a result that the page information about the package media sales page was transmitted to the above client terminal 1002 is received sequentially via the network interface 1093 and the communication control section 1092, a retrieval section 1099 extracts a search key for retrieving the above specific package media from the above received media information request signal.

Then, the retrieval section 1099 retrieves the package media information about the specific package media that corresponds to the search condition indicated by the above search key out of the plural package media information in the package media information storing section 1098, based on the search key.

The control section 1090 transmits that retrieved package media information to the client terminal 1002 sequentially via the communication control section 1092 and the network interface 1093. Thus, the package media information about the specific package media is shown the user.

As a result, if receiving a purchase request signal for requesting the purchase of the aforementioned specific package media that was transmitted from the client terminal 1002 sequentially via the network interface 1093 and the communication control section 1092, the control section 1090 performs purchase processing such as the delivery procedure of the above specific package media to the user using the above client terminal 1002.

On the other hand, the control section 1090 transmits charging information to be used in charging processing to the user in connection with the purchase of the specific package media, to a predetermined charging server (not shown) sequentially via the communication control section 1092 and the network interface 1093, to make this charging server perform the charging processing corresponding to the purchase of the specific package media to the above user.

Furthermore, if the charging processing to the user is completed by this charging server, the control section 1090 transmits purchase completion page information that indicates the completion of the package media purchase processing to the client terminal 1002, sequentially via the communication control section 1092 and the network interface 1093.

(2-4) Display of A Corporation CD Sales Page Through Top Page

Figure 21:
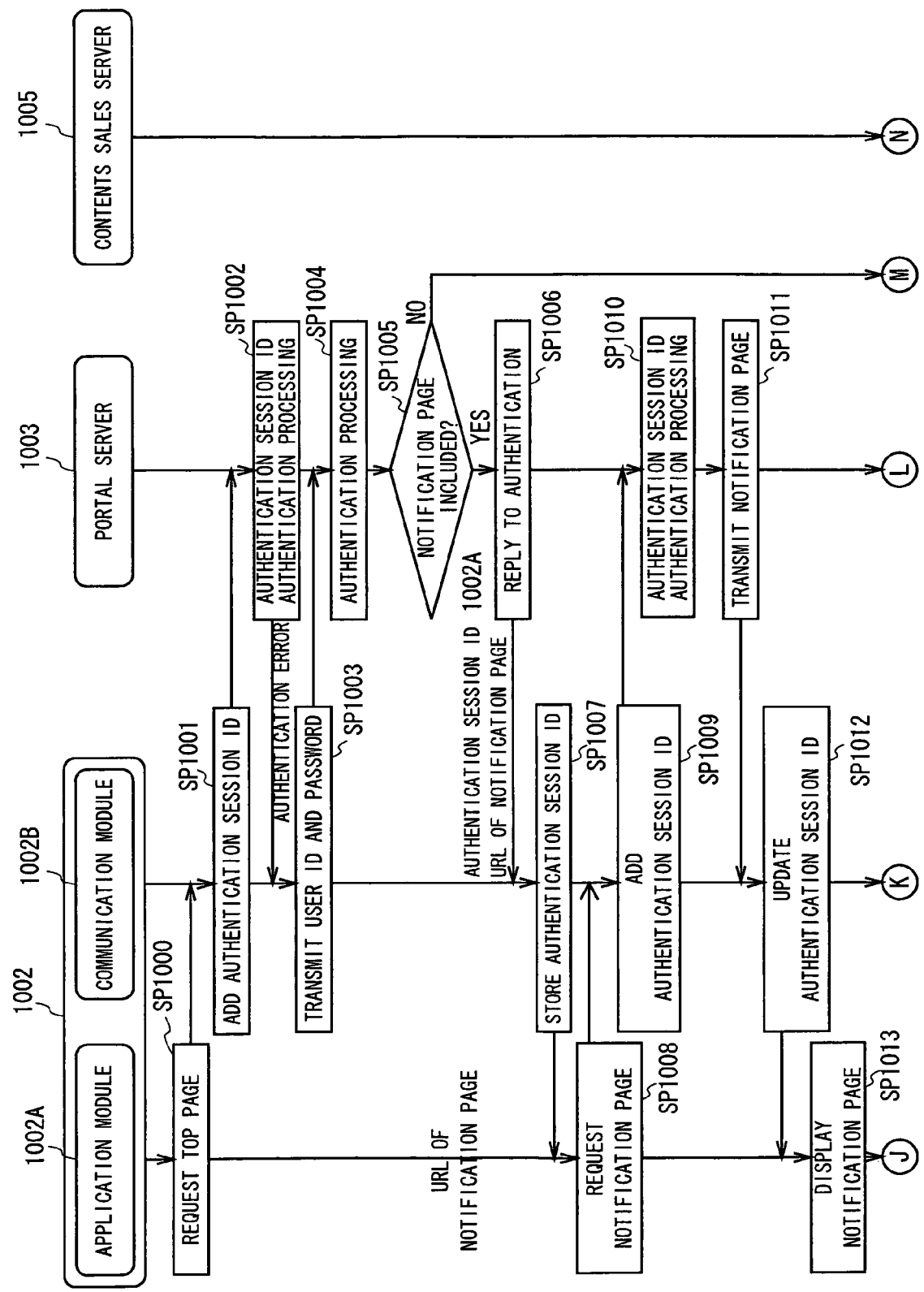
FIG. 21 is a sequence chart showing a page display processing procedure for an A Corporation CD sales page by way of the top page.

Next, the display processing procedure of a package media sales page (here the A Corporation CD sales page) through the top page in the second embodiment will be described with reference to sequence charts shown in FIGS. 21 and 22.

Note that, an application module 1002A of the client terminal 1002 in FIGS. 21 to 24 corresponds to the control section 1023, the input processing section 1021, the display control section 1024, and the page information generation section 1036 in FIG. 18, and a communication module 1002B corresponds to the communication control section 1032 and the authentication processing section 1037 in FIG. 18.

If that the operation for displaying the top page in the display section 1025 was performed is recognized, the application module 1002A of the client terminal 1002 proceeds to step SP1000 to deliver a request signal for requesting page information about (the source) of the top page (hereinafter, this is also referred to as a top page request signal) to the communication module 1002B.

If receiving the top page request signal is received in step SP1001, the communication module 1002B of the client terminal 1002 reads authentication session ID information or the like temporarily stored beforehand in the authentication information storing section 1038, and transmits the authentication session ID information or the like and the top page request signal to the portal server 1003 via the network interface 1033.

In this connection, this authentication session ID information is identification information issued by the portal server 1003 for identifying the individual communication link status (namely, the session), every time when the client terminal 1002 and the portal server 1003 establish a communication link for performing various processing such as user authentication processing.

For the use of the user authentication processing or the like, the authentication session ID information is also provided with a validity period (for example, about one minute) predetermined by the portal server 1003 based on the time when the authentication session ID information was issued.

Therefore, when the client terminal 1002 that has obtained the authentication session ID information from the portal server 1003 is unable to present the authentication session ID information to the portal server 1003 within the validity period, the communication link status specified by the authentication session ID information is determined to have been cut off by the portal server 1003.

This enables the portal server 1003 to prevent the previously issued authentication session ID information from being unfairly used for the user authentication processing or the like by the user who has not made a contract with the operator of the contents sales system.

The authentication session ID information temporarily stored in the authentication information storing section 1038 of the client terminal 1002 is authentication session ID information issued by the portal server 1003 when the client terminal 1002 and the portal server 1003 previously established a communication link for performing the user authentication processing or the like.

If the authentication session ID information or the like and the top page request signal are transmitted from the client terminal 1002, in response thereto, in step SP1002, the control section 1050 of the portal server 1003 receives the authentication session ID information or the like and the top page request signal sequentially via the network interface 1053 and the communication control section 1052, and transmits the authentication session ID information or the like to the authentication processing section 1056.

The authentication processing section 1056 performs the user authentication processing based on the received authentication session ID information or the like, under the control of the control section 1050.

As a result, if the user using the client terminal 1002 is unable to be authenticated as the registered user, because of the expiration of the validity period of the authentication session ID information or the like received from the client terminal 1002, or the like, the authentication processing section 1056 determines that the request of the top page from the client terminal 1002 is not an authorized request.

In this case, the control section 1050 transmits authentication error information indicating the authentication error to the client terminal 1002, sequentially via the communication control section 1052 and the network interface 1053.

In step SP1003, if the authentication error information is received via the network interface 1033, the communication module 1002B of the client terminal 1002 reads out the user ID information, the password information and the like that have been stored in the authentication information storing section 1038, and transmits the above read user ID information password information and the like, to the portal server 1003 via the network interface 1033.

In step SP1004, the control section 1050 of the portal server 1003 receives the user ID information, the password information, and the like sequentially via the network interface 1053 and the communication control section 1052, and transmits them to the authentication processing section 1056.

As the user authentication processing, the authentication processing section 1056 determines whether or not the user ID information, the password information, and the like, received from the client terminal 1002 are included in the customer information registered in the customer database section 1054, under the control of the control section 1050.

As a result, if the user using the client terminal 1002 is authenticated as the registered user, the authentication processing section 1056 issues authentication session ID information related to the current communication link status between the client terminal 1002 and the portal server 1003, or the like, as portal authentication result information.

At this time, the authentication processing section 1056 temporarily stores this authentication session ID information issued to the client terminal 1002 or the like in the authentication information storing section 1057, under the control of the control section 1050.

In the next step SP1005, the control section 1050 of the portal server 1003 determines whether or not page information about a notification page exists in the page information storing section 1055. In this connection, similarly to the aforementioned first embodiment, the notification page is a page in which for example maintenance information about the portal server 1003, the current status of the CD sales service in the contents sales server 1005 and the like are described.

If an affirmative result is obtained in this step SP1005, the control section 1050 proceeds to step SP1006 to transmit the authentication session ID information that was issued by the authentication processing section 1056 to the client terminal 1002 or the like and for example an URL indicating the memory location of the page information about the notification page, to the client terminal 1002 sequentially via the communication control section 1052 and the network interface 1053.

In step SP1007, the communication module 1002B of the client terminal 1002 receives the authentication session ID information or the like and the URL of the notification page, transmitted from the portal server 1003, via the network interface 1033, and temporarily stores the above received authentication session ID information or the like in the authentication information storing section 1038, and delivers the URL of the notification page to the application module 1002A. In this connection, the URL of the notification page is assumed to indicate the portal server 1003.

In step SP1008, the application module 1002A of the client terminal 1002 generates a request signal for requesting page information about the notification page, based on the URL of the notification page received from the portal server 1003 via the communication module 1002B (hereinafter, this is also referred to as a notification page request signal), and delivers the request signal to the communication module 1002B.

If the notification page request signal is received in step SP1009, the communication module 1002B of the client terminal 1002 reads out the authentication session ID information or the like temporarily stored in the authentication information storing section 1038, and transmits the authentication session ID information or the like and the notification page request signal to the portal server 1003 via the network interface 1033.

In step SP1010, the control section 1050 of the portal server 1003 receives the authentication session ID information or the like and the notification page request signal transmitted from the client terminal 1002, sequentially via the network interface 1053 and the communication control section 1052, and transmits the authentication session ID information or the like to the authentication processing section 1056.

The authentication processing section 1056 performs the user authentication processing so as to compare the received authentication session ID information or the like with the authentication session ID information or the like that was issued in the aforementioned step SP1004 to the client terminal 1002 and has been temporarily stored in the authentication information storing section 1057, under the control of the control section 1050.

As a result, if the user using the client terminal 1002 is authenticated as the registered user in step SP1011, the authentication processing section 1056 determines that the request of the notification page from the client terminal 1002 is the authorized request, and extends the validity period of the authentication session ID information or the like issued to the client terminal 1002.

At this time, the control section 1050 of the portal server 1003 reads the page information about the notification page requested by the user from the page information storing section 1055, and transmits the page above read information together with the authentication session ID information or the like of which the validity period has been extended by the authentication processing section 1056, to the client terminal 1002 sequentially via the communication control section 1052 and the network interface 1053.

In step SP1012, the communication module 1002B of the client terminal 1002 receives the page information about the notification page, and the authentication session ID information or the like of which the validity period has been extended, each transmitted from the portal server 1003, via the network interface 1033, and delivers the above received page information to the application module 1002A. In addition, the communication module 1002B of the client terminal 1002 temporarily stores the authentication session ID information or the like of which the validity period has been extended, in the authentication information storing section 1038, in such a manner that the authentication session ID information before the validity period or the like was extended is overwritten with the authentication session ID information or the like of which the validity period has been extended, to update the authentication session ID information or the like temporarily stored in the aforementioned step SP1007 to the authentication session ID information or the like of which the validity period has been extended. Then, the communication module 1002B of the client terminal 1002 proceeds to the next step SP1016 (FIG. 22). Note that, step SP1015 in FIG. 22 is a step that is performed only when a negative result is obtained in step SP1005 in FIG. 21.

In step SP1013, the application module 1002A displays the notification page in the display section 1025 based on the page information about the notification page supplied from the communication module 1002B.

Figure 22:
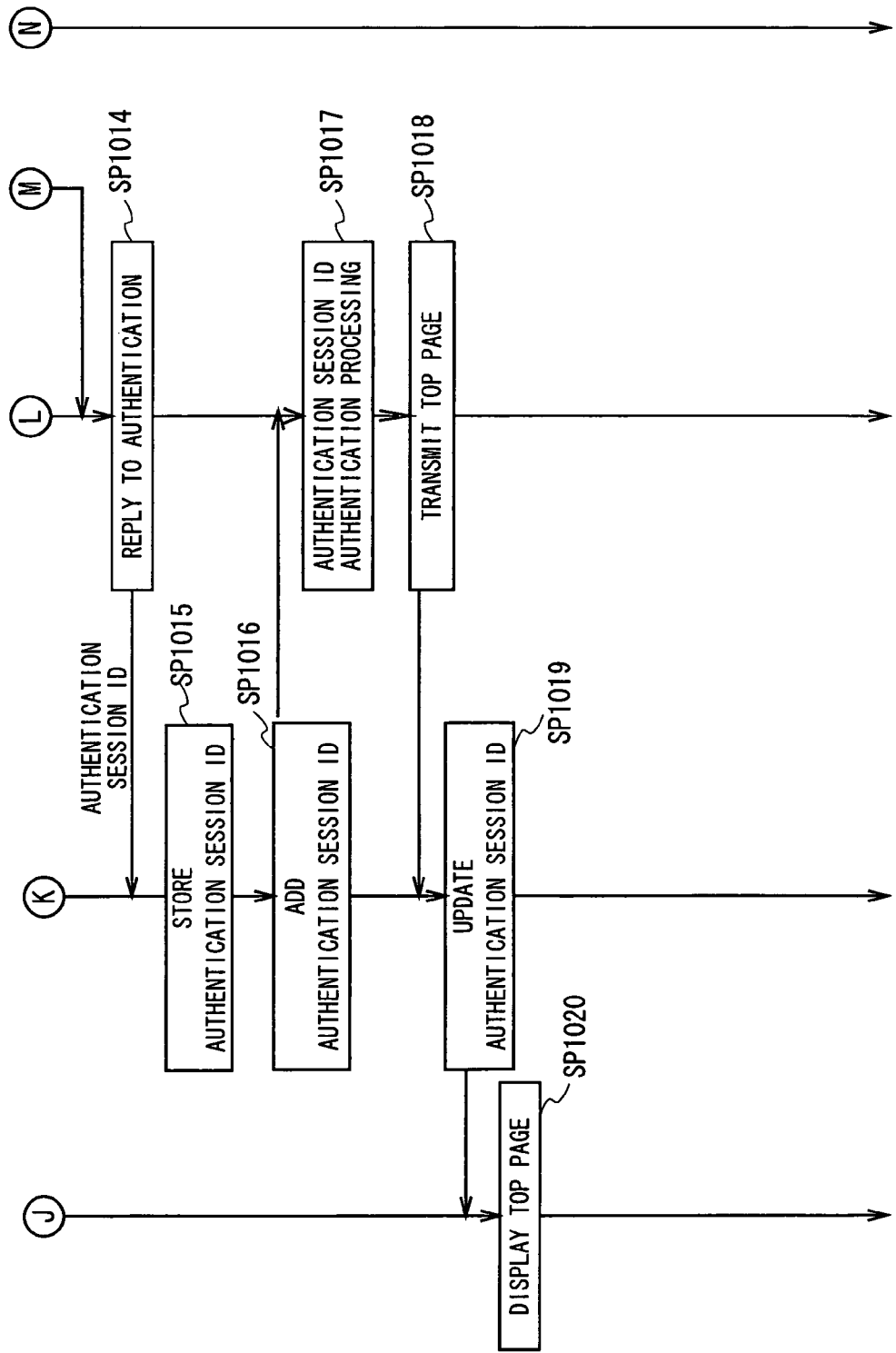
FIG. 22 is a sequence chart following the sequence chart in FIG. 21 showing a page display processing procedure for the A Corporation CD sales page by way of the top page.

On the other hand, when the negative result is obtained in the aforementioned step SP1005, that is, when the page information about the notification page does not exist in the page information storing section 1055, the control section 1050 of the portal server 1003 proceeds to step SP1014 (FIG. 22). In this step SP1014, the control section 1050 of the portal server 1003 transmits the authentication session ID information or the like that was issued by the authentication processing section 1056 to the client terminal 1002 in the aforementioned step SP1004, to the client terminal 1002 sequentially via the communication control section 1052 and the network interface 1053.

In step SP1015, the communication module 1002B of the client terminal 1002 receives the authentication session ID information or the like transmitted from the portal server 1003 via the network interface 1033, and temporarily stores the received authentication session ID information or the like in the authentication information storing section 1038, and proceeds to the next step SP1016.

In step SP1016, the communication module 1002B reads the authentication session ID information or the like temporarily stored in the authentication information storing section 1038, and transmits the authentication session ID information or the like and the top page request signal obtained in step SP1001, to the portal server 1003 via the network interface 1033.

If the authentication session ID information or the like and the top page request signal are transmitted from the client terminal 1002, in response thereto, in step SP1017, the control section 1050 of the portal server 1003 receives the authentication session ID information or the like and the top page request signal sequentially via the network interface 1053 and the communication control section 1052, and transmits the authentication session ID information or the like to the authentication processing section 1056.

The authentication processing section 1056 performs user authentication processing based on the received authentication session ID information or the like, under the control of the control section 1050.

As a result, if the user using the client terminal 1002 is authenticated as the registered user, the authentication processing section 1056 determines that the request of the top page from the client terminal 1002 is an authorized request, and extends the validity period of the authentication session ID information or the like issued to the client terminal 2.

At this time, in the next step SP1018, the control section 1050 of the portal server 1003 reads the page information about the top page requested by the user from the page information storing section 1055, and transmits the above read page information together with the authentication session ID information or the like of which the validity period has been extended by the authentication processing section 1056, to the client terminal 1002 sequentially via the communication control section 1052 and the network interface 1053.

In step SP1019, the communication module 1002B of the client terminal 1002 receives the page information about the top page, and the authentication session ID information of which the validity period has been extended, transmitted from the portal server 1003, via the network interface 1033, and transmits the above received page information to the application module 1002A. In addition, the communication module 1002B of the client terminal 1002 temporarily stores the authentication session ID information or the like of which the validity period has been extended in the authentication information storing section 1038, in such a manner that the authentication session ID information or the like before the validity period was extended is overwritten with the authentication session ID information or the like of which the validity period has been extended, in order to update the authentication session ID information or the like temporarily stored in the aforementioned steps SP1012 or SP1015 to the authentication session ID information or the like of which the validity period has been extended.

In step SP1020, the application module 1002A displays the top page in the display section 1025 based on the page information about the top page supplied from the communication module 1002B.

If a link button leading to the A Corporation CD sales page currently displayed in the top page (for example, the button BT1 in FIG. 3) is depressed, the application module 1002A delivers a request signal for requesting page information about the A Corporation CD sales page (hereinafter, this is referred to as a sales page request signal) to the communication module 1002B, based on the URL embedded in the link. Then, the application module 1002A performs the same processing as in steps SP1051 to SP1081 in the display processing procedure of the A Corporation CD sales page from a bookmark that will be described later (however, steps SP1057 to SP1065 may be omitted), and displays the A Corporation CD sales page in the display section 1025.

(2-5) Display of A Corporation CD Sales Page from Bookmark

Figure 23:
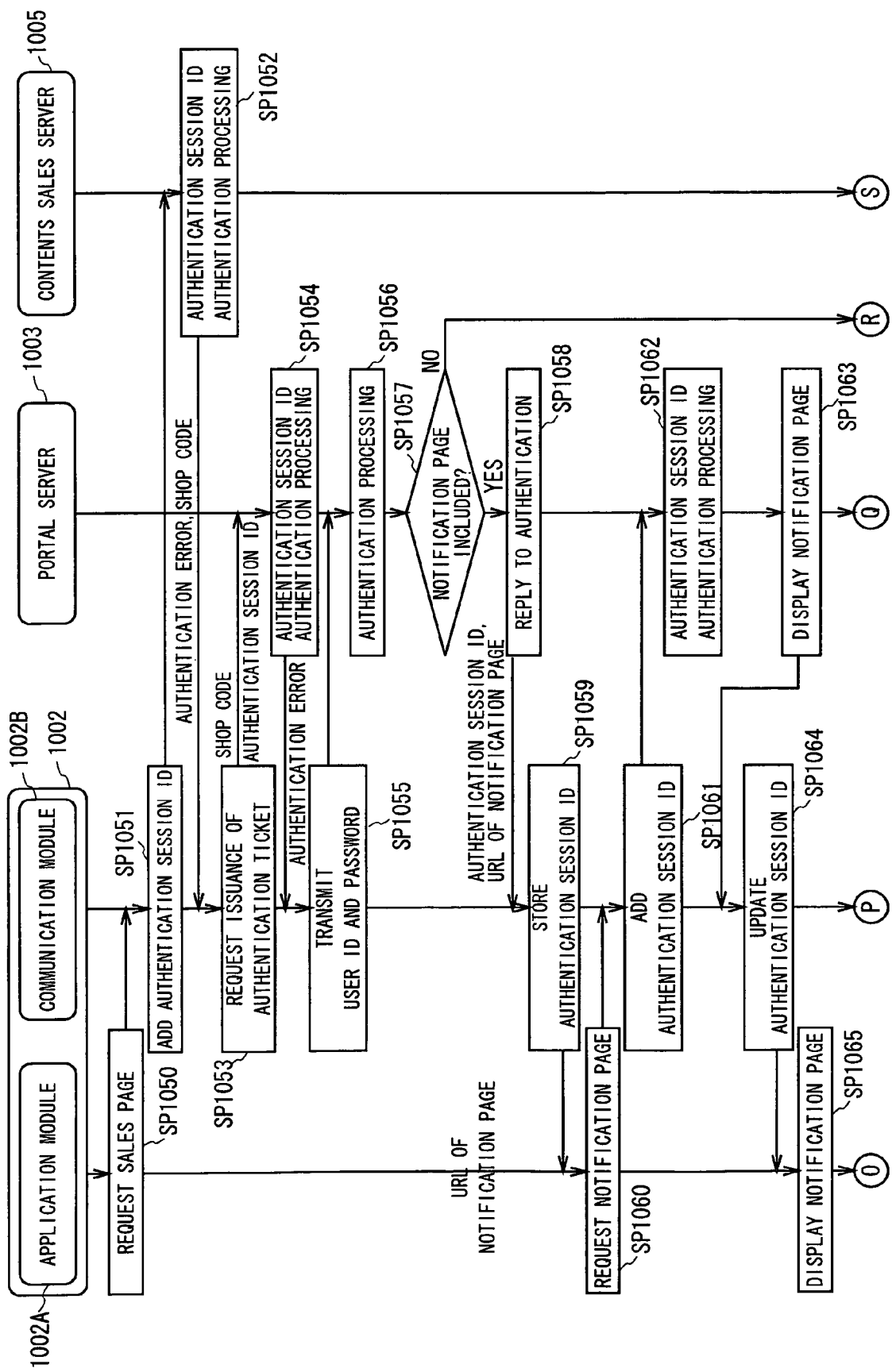
FIG. 23 is a sequence chart showing a page display processing procedure for the A Corporation CD sales page from a bookmark.

Next, the display processing procedure of the A Corporation CD sales page from the bookmark in this second embodiment will be described with reference to sequence charts shown in FIGS. 23 and 24.

If for example that the operation to display the A Corporation CD sales page in which the URL is registered as the bookmark in the display section 1025 was performed is recognized the application module 1002A of the client terminal 1002 proceeds to step SP1050 to deliver the sales page request signal for requesting the page information about the A Corporation CD sales page to the communication module 1002B.

If the sales page request signal is recognized in step SP1051, the communication module 1002B of the client terminal 1002 reads the service session ID information or the like that has been temporarily stored beforehand in the authentication information storing section 1038, and transmits the service session ID information or the like and the sales page request signal to the contents sales server 1005 via the network interface 1033.

In this connection, the service session ID information is the identification information that is issued by the contents sales server 1005 accessed by the client terminal 1002, for the identification of each communication link status (namely, session), every time when the client terminal 1002 and the contents sales server 1005 establish a communication link for performing various processing such as the user authentication processing.

Note that, similarly to the aforementioned authentication session ID information, a predetermined validity period (for example, approximately one minute) is provided for the above service session ID information based on the time when it was issued by the contents sales server 1005, for the use of the user authentication processing or the like.

Accordingly, if the client terminal 1002, that has obtained the service session ID information from the contents sales server 1005 cannot present the service session ID information within the validity period to the contents sales server 1005 that issued the service session ID information, the communication link status specified by the above service session ID information is determined to have been cut off by this contents sales server 1005.

In this manner, the contents sales server 1005 prevents the previously service session ID information issued in the past from being unfairly used in the user authentication processing or the like by the user who has not made a contract with the operator of the contents sales system.

Moreover, the service session ID information temporarily stored in the authentication information storing section 1038 is the service session ID information that was issued by the contents sales server 1005 accessed by the client terminal 1002, when the client terminal 1002 and the contents sales server 1005 established the communication link for performing the user authentication processing or the like in the past.

In step SP1052, the control section 1090 of the contents sales server 1005 receives the service session ID information or the like and the sales page request signal transmitted from the client terminal 1002 sequentially via the network interface 1093 and the communication control section 1092, and transmits the service session ID information or the like to the authentication processing section 1095.

Under the control of the control section 1090, the authentication processing section 1095 performs the user authentication processing by comparing the received service session ID information or the like with the service session ID information or the like that has already been temporarily stored in the authentication information storing section 1097.

As a result, if the user using the above client terminal 1002 cannot be authenticated as the registered user, for example, because of the expiration of the validity period of the service session ID information, or the like, received from the client terminal 1002, the authentication processing section 1095 determines that the request of the sales page information from the client terminal 1002 is the unauthorized request.

In this case, the control section 1090 transmits authentication error information indicating the authentication error and a shop code for identifying the contents sales server 1005, to the client terminal 1002 sequentially via the communication control section 1092 and the network interface 1093.

In step SP1053, the communication module 1002B of the client terminal 1002 receives the authentication error information and the shop code transmitted from the contents sales server 1005 via the network interface 1033.

Here, if that the user was not authenticated in the contents sales server 1005 is recognized based on the authentication error information received from the contents sales server 1005, the communication module 1002B generates an authentication ticket issuance request signal for requesting the issuance of an authentication ticket for accessing the contents sales server 1005, and transmits the authentication ticket issuance request signal together with the received shop code and the authentication session ID information or the like temporarily stored in the authentication information storing section 1038, to the portal server 1003 via the network interface 1033.

At this time, the communication module 1002B temporarily stores the received shop code in the authentication information storing section 1038.

In step SP1054, the control section 1050 of the portal server 1003 receives the authentication ticket issuance request signal, the shop code, and the authentication session ID information or the like transmitted from the client terminal 1002, sequentially via the network interface 1053 and the communication control section 1052, and transmits them to the authentication processing section 1056.

The authentication processing section 1056 performs user authentication processing by comparing this authentication session ID information or the like with the authentication session ID information or the like that have already been temporarily stored in the authentication information storing section 1057, under the control of the control section 1050.

As a result, if the user using the above client terminal 1002 cannot be authenticated as the registered user, for example, because the validity period of the authentication session ID information received from the client terminal 1002 has already expired, the authentication processing section 1056 determines that the issuance request of the authentication ticket from the client terminal 1002 is an unauthorized request.

In this case, the control section 1050 transmits authentication error information indicating the authentication error to the client terminal 1002, sequentially via the communication control section 1052 and the network interface 1053.

If the authentication error information is received from the portal server 1003 via the network interface 1033, in step SP1055, the communication module 1002B of the client terminal 1002 reads the user ID information and the password information or the like stored in the authentication information storing section 1038, and transmits the above read user ID information and password information or the like to the portal server 1003 via the network interface 1033.

In step SP1056, the control section 1050 of the portal server 1003 receives the user ID information and the password information or the like sequentially via the network interface 1053 and the communication control section 1052, and transmits it to the authentication processing section 1056.

As the user authentication processing, the authentication processing section 1056 determines whether or not the user ID information and password information or the like received from the client terminal 1002 is included in customer information that has been registered in the customer database section 1054, under the control of the control section 1050.

As a result, if the user using the client terminal 1002 is authenticated as the registered user, the authentication processing section 1056 issues authentication session ID information related to the current communication link status between the client terminal 1002 and the portal server 1003, or the like, as portal authentication result information.

At this time, the authentication processing section 1056 also temporarily stores this authentication session ID information or the like issued to the client terminal 1002 in the authentication information storing section 1057, under the control of the control section 1050.

In the next step SP1057, the control section 1050 of the portal server 1003 determines whether or not the page information about the notification page exists in the page information storing section 1055.

If an affirmative result is obtained in this step SP1057, the control section 1050 proceeds to step SP1058. In step SP1058, the control section 1050 of the portal server 1003 transmits the authentication session ID information or the like issued by the authentication processing section 1056 to the client terminal 1002, and for example the URL indicating the memory location of the page information about the notification page, to the client terminal 1002 sequentially via the communication control section 1052 and the network interface 1053.

In step SP1059, the communication module 1002B of the client terminal 1002 receives the authentication session ID information or the like and the URL of the notification page, transmitted from the portal server 1003, via the network interface 1033, and temporarily stores the above received authentication session ID information or the like in the authentication information storing section 1038, and delivers the URL of the notification page to the application module 1002A.

In step SP1060, the application module 1002A of the client terminal 1002 generates a notification page request signal for requesting page information about a notification page, based on the URL of the notification page received from the portal server 1003 via the communication module 1002B, and delivers the notification page request signal to the communication module 1002B.

If the notification page request signal is received, in step SP1061, the communication module 1002B reads the authentication session ID information or the like temporarily stored in the authentication information storing section 1038, and transmits this authentication session ID information or the like and the notification page request signal to the portal server 1003, via the network interface 1033.

In step SP1062, the control section 1050 of the portal server 1003 receives the authentication session ID information or the like and the notification page request signal transmitted from the client terminal 1002 sequentially via the network interface 1053 and the communication control section 1052, and transmits this authentication session ID information or the like to the authentication processing section 1056.

The authentication processing section 1056 performs user authentication processing by comparing the received authentication session ID information or the like with the authentication session ID information or the like that was issued to the client terminal 1002 in the aforementioned step SP1056 and has been temporarily stored in the authentication information storing section 1057, under the control of the control section 1050.

As a result, if the user using the client terminal 1002 is authenticated as the registered user, in step SP1063, the authentication processing section 1056 determines that the request of the notification page from the client terminal 1002 is an authorized request, and extends the validity period of the authentication session ID information or the like issued to the client terminal 1002.

At this time, the control section 1050 of the portal server 1003 reads the page information about the notification page requested by the user from the page information storing section 1055, and transmits the above read page information together with the authentication session ID information or the like of which the validity period has been extended by the authentication processing section 1056, to the client terminal 1002 sequentially via the communication control section 1052 and the network interface 1053.

In step SP1064, the communication module 1002B of the client terminal 1002 receives the page information about the notification page and the authentication session ID information or the like of which the validity period has been extended, transmitted from the portal server 1003, via the network interface 1033, and transmits the above received page information to the application module 1002A. In addition, the communication module 1002B of the client terminal 1002 temporarily stores the authentication session ID information or the like of which the validity period has been extended in the authentication information storing section 1038, in such a manner that the authentication session ID information or the like before the validity period was extended is overwritten with the authentication session ID information or the like of which the validity period has been extended, in order to update the authentication session ID information temporarily stored in the aforementioned step SP1059 to the authentication session ID information of which the validity period has been extended or the like. Then, the communication module 1002B of the client terminal 1002 proceeds to the next step SP1068 (FIG. 24). Note that, step SP1067 in FIG. 24 is a step that is performed only when a negative result was obtained in step SP1057 in FIG. 23.

In step SP1065, the application module 1002A displays a notification page in the display section 1025, based on the page information about the notification page supplied from the communication module 1002B.

Figure 24:
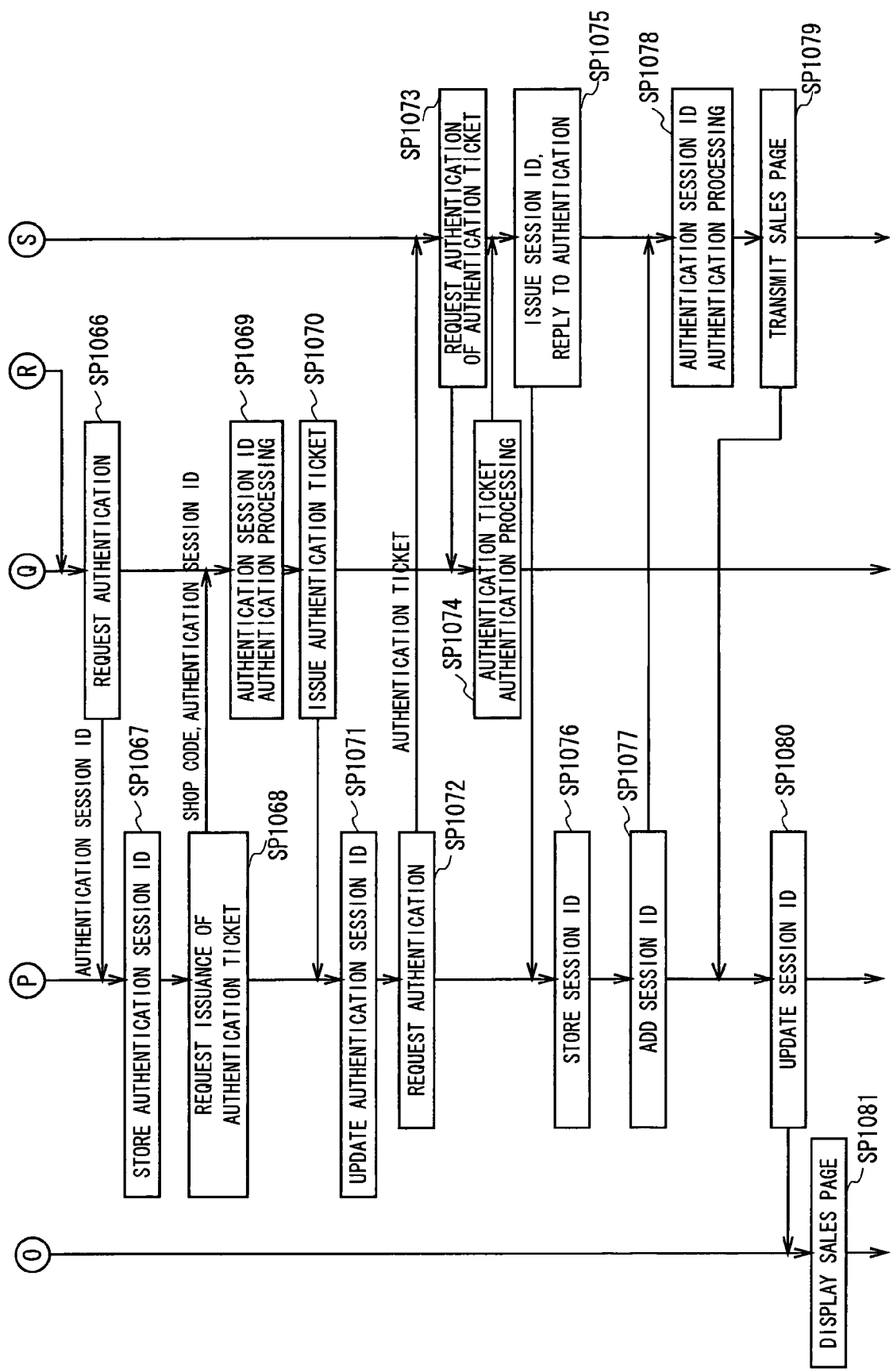
FIG. 24 is a sequence chart following the sequence chart in FIG. 23, showing a page display processing procedure for the A Corporation CD sales page from the bookmark.

On the other hand, if a negative result is obtained in the aforementioned step SP1057, that is if the page information about the notification page does not exist in the page information storing section 1055, the control section 1050 of the portal server 1003 proceeds to step SP1066 (FIG. 24). In this step SP1066, the control section 1050 of the portal server 1003 transmits the authentication session ID information or the like that the authentication processing section 1056 issued to the client terminal 1002 in the aforementioned step SP1054, to the client terminal 1002 sequentially via the communication control section 1052 and the network interface 1053.

In step SP1067, the communication module 1002B of the client terminal 1002 receives the authentication session ID information or the like transmitted from the portal server 1003 via the network interface 1033, and temporarily stores the above received authentication session ID information or the like in the authentication information storing section 1038, and then proceeds to the next step SP1068.

In step SP1068, the communication module 1002B generates an authentication ticket issuance request signal for requesting again the portal server 1003 to issue the authentication ticket, and transmits the authentication ticket issuance request signal together with the shop code and the authentication session ID information or the like stored in the authentication information storing section 1038, to the portal server 1003 via the network interface 1033.

In this embodiment, the shop code is temporarily stored in the authentication information storing section 1038 of the client terminal 1002. However, the present invention is not only limited to this but also, when the processing in steps SP1051 to SP1068 is performed between the above client terminal 1002 and the portal server 1003, the shop code may be sequentially transmitted and received, so that the shop code can be transmitted to the portal server 1003 in step SP1068 without temporarily storing the shop code in the authentication information storing section 1038 of the client terminal 1002.

In step SP1069, the control section 1050 of the portal server 1003 receives the authentication ticket issuance request signal, the shop code and the authentication session ID information, and the like, transmitted from the client terminal 1002 sequentially via the network interface 1053 and the communication control section 1052, and transmits them to the authentication processing section 1056.

The authentication processing section 1056 performs user authentication processing by comparing the received authentication session ID information and the like with the authentication session ID information and the like temporarily stored in the authentication information storing section 1057, under the control of the control section 1050.

As a result, if the user using the client terminal 1002 is authenticated as the registered user, for example, because the validity period of the authentication session ID information received from the client terminal 1002 has not yet expired, the authentication processing section 1056 determines that the issuance request of the authentication ticket from the above client terminal 1002 is the authorized request. In the next step SP1070, the authentication processing section 1056 issues an authentication ticket or the like for accessing the contents sales server 1005 indicated by the above shop code as portal authentication result information, based on the shop code and the authentication ticket issuance request signal received from the client terminal 1002 in the aforementioned step SP1069.

The authentication processing section 1056 temporarily stores this authentication ticket or the like in the authentication information storing section 1057, under the control of the control section 1050, and extends the validity period of the authentication session ID information or the like that has been issued to the client terminal 1002.

The control section 1050 of the portal server 1003 transmits the authentication ticket or the like issued by the authentication processing section 1056 together with the authentication session ID information or the like of which the validity period has been extended, to the client terminal 1002 sequentially via the communication control section 1052 and the network interface 1053.

In step SP1071, the communication module 1002B of the client terminal 1002 receives the authentication ticket or the like and the authentication session ID information or the like of which the validity period has been extended, each transmitted from the portal server 1003, via the network interface 1033, and proceeds to the next step SP1072.

In step SP1072, the communication module 1002B transmits the received authentication ticket or the like together with the authentication request signal, to the contents sales server 1005 via the network interface 1033.

At this time, the communication module 1002B also temporarily stores the authentication session ID information or the like of which the validity period has been extended, received from the portal server 1003, in the authentication information storing section 1038, in such a manner that the authentication session ID information or the like before the validity period was extended is overwritten with the received authentication session ID information or the like of which the validity period has been extended, in order to update the authentication session ID information or the like temporarily stored in the aforementioned steps SP1064 or SP1067 to the authentication session ID information or the like of which the validity period has been extended.

In step SP1073, if receiving the authentication request signal and the authentication ticket or the like transmitted from the client terminal 1002 sequentially via the network interface 1093 and the communication control section 1092, the control section 1090 of the contents sales server 1005 transmits the received authentication ticket or the like together with an authentication ticket confirmation request signal for requesting the confirmation of the authentication ticket or the like, to the portal server 1003 sequentially via the communication control section 1092 and the network interface 1093.

In step SP1074, the control section 1050 of the portal server 1003 receives the authentication ticket confirmation request signal and the authentication ticket or the like, transmitted from the contents sales server 1005 sequentially via the network interface 1053 and the communication control section 1052, and transmits them to the authentication processing section 1056.

The authentication processing section 1056 performs confirmation processing of the received authentication ticket or the like by comparing the received authentication ticket or the like with the authentication ticket or the like temporarily stored in the authentication information storing section 1057, in accordance with this authentication ticket confirmation request signal, under the control of the control section 1050.

If the received authentication ticket or the like is confirmed as the registered authentication ticket or the like by the authentication processing section 1056, the control section 1050 transmits confirmation result information indicating that the authentication ticket or the like has been confirmed as the regular authentication ticket or the like to the contents sales server 1005 sequentially via the communication control section 1052 and the network interface 1053.

In step SP1075, the control section 1090 of the contents sales server 1005 receives the confirmation result information transmitted from the portal server 1003 sequentially via the network interface 1093 and the communication control section 1092, and transmits this information to the authentication processing section 1095.

The authentication processing section 1095 issues service session ID information or the like related to the current communication link status between the client terminal 1002 and the contents sales server 1005, in accordance with the confirmation result information, under the control of the control section 1090, and temporarily stores the issued service session ID information or the like in the authentication information storing section 1097.

The control section 1090 of the contents sales server 1005 transmits the issued service session ID information or the like to the client terminal 1002, sequentially via the communication control section 1092 and the network interface 1093.

In step SP1076, the communication module 1002B of the client terminal 1002 receives the service session ID information or the like transmitted from the contents sales server 1005 via the network interface 1033, and temporarily stores the received service session ID information or the like in the authentication information storing section 1038, and then proceeds to the next step SP1077.

In step SP1077, the communication module 1002B transmits again the sales page request signal obtained in the aforementioned step SP1051 together with the service session ID information or the like temporarily stored in the authentication information storing section 1038 in step SP1076, to the contents sales server 1005 via the network interface 1033.

In step SP1078, the control section 1090 of the contents sales server 1005 receives the sales page request signal and the service session ID information, and the like, transmitted from the client terminal 1002, sequentially via the network interface 1093 and the communication control section 1092, and transmits the service session ID information and the like to the authentication processing section 1095.

The authentication processing section 1095 performs user authentication processing by comparing the received service session ID information or the like with the service session ID information or the like that was already issued to the client terminal 1002 and has been temporarily stored in the authentication information storing section 1097 in the aforementioned step SP1075, under the control of the control section 1090.

As a result, if the user using the client terminal 1002 is authenticated as the registered user, for example, because the validity period of the service session ID information or the like that was received from the client terminal 1002 has not expired yet, the authentication processing section 1095 determines that the request of the A Corporation CD sales page from the client terminal 1002 is the authorized request, and extends the validity period of the service session ID information or the like that has been issued to the client terminal 1002.

At this time, in the next step SP1079, the control section 1090 reads the page information about the A Corporation CD sales page requested by the user, from the page information storing section 1096, and transmits the above read page information together with the service session ID information or the like of which the validity period has been extended by the authentication processing section 1095, to the client terminal 1002 sequentially via the communication control section 1092 and the network interface 1093.

In step SP1080, the communication module 1002B of the client terminal 1002 receives the page information about the A Corporation CD sales page, and the service session ID information or the like of which the validity period has been extended, transmitted from the contents sales server 1005, via the network interface 1033, and transmits the above received page information about the A Corporation CD sales page to the application module 1002A. In addition, the communication module 1002B of the client terminal 1002 temporarily stores the service session ID information or the like of which the validity period has been extended in the authentication information storing section 1038, in such a manner that the service session ID information or the like before the validity period was extended is overwritten with the service session ID information or the like of which the validity period has been extended, in order to update the service session ID information or the like temporarily stored in the aforementioned step SP1076 to the service session ID information or the like of which the validity period has been extended.

In step SP1081, the application module 1002A displays the A Corporation CD sales page in the display section 1025, based on the page information about the A Corporation CD sales page supplied from the communication module 1002B.

According to the above configuration, the same effect as the aforementioned first embodiment can be obtained also in the contents sales system according to this second embodiment.

By the way, among the program modules of the client terminal 2 (FIG. 10) explained in the aforementioned first embodiment, the HTTP message program 50 and the communicator program 51 are program modules capable of realizing the same functions as the communication control section 1032 of the client terminal 1002 (FIG. 18) described in this second embodiment.

The contents reproduction module 52 (FIG. 10) is the program module capable of realizing the same functions as the encoder/decoder section 1034 (FIG. 18).

Further, the copyright protection management module 53 (FIG. 10) is a program module capable of realizing the same functions as the copyright management section 1035 (FIG. 18).

Further, the Internet radio channel selection reproduction module 54 (FIG. 10) is a program module capable of realizing the same functions as the control section 1023 and the audio control section 1026 (FIG. 18).

Further, the music purchase reproduction module 55 (FIG. 10) is a program module capable of realizing the same functions as the control section 1023 and the audio control section 1026 (FIG. 18).

Further, the XML browser 56 (FIG. 10) is a program module capable of realizing the same functions as the input processing section 1021 and the page information generation section 1036 (FIG. 18).

Further, the hard disk contents controller 57, the database access module 59, and the contents data access module 60 (FIG. 10) are program modules capable of realizing the same functions as the control section 1023 (FIG. 18).

Further, the authentication library 58A of the library 58 (FIG. 10) is a program module capable of realizing the same functions as the authentication processing section 1037 and the authentication information storing section 1038 (FIG. 18).

Further, the clip library 58B of the library 58 (FIG. 10) is a program module capable of realizing the same functions as the control section 1023 (FIG. 18).

Further, the radio broadcast information display module 61 (FIG. 10) is a program module capable of realizing the same functions as the radio broadcast display control section 1039 (FIG. 18).

Further, the tuner channel selection reproduction/sound recording module 62 (FIG. 10) is a program module capable of realizing the same functions as the control section 1023, the audio control section 1026, and the tuner section 1031 (FIG. 18).

Further, the audio user interface 63 (FIG. 10) is a program module capable of realizing the same functions as the input processing section 1021, the control section 1023, and the display control section 1024 (FIG. 18).

Further, the CD reproduction module 64 (FIG. 10) is a program module capable of realizing the same functions as the audio control section 1026 and the external recording medium recording/reproducing section 1028 (FIG. 18).

Further, the HDD reproduction module 65 (FIG. 10) is a program module capable of realizing the same functions as the control section 1023 and the audio control section 1026 (FIG. 18).

Accordingly, the client terminal 2 having the hardware circuit block configuration in the aforementioned first embodiment, in which the CPU 30 uses various program modules, is also capable of performing the same processing as the client terminal 1002 having the functional circuit block configuration in this second embodiment.

Further, in the portal server 4 in the aforementioned first embodiment (FIG. 6), various programs to be stored in the ROM 11 and the hard disk drive 12 are suitably selected in accordance with the functions of the portal server 1003 (FIG. 19) in the aforementioned second embodiment. Thereby, the control section 10 functions similarly to the control section 1050, the communication control section 1052 and the authentication processing section 1056, of the portal server 1003, according to the above various programs, and also the ROM 11, the RAM 14 and the hard disk drive 12 can be used similarly to the customer database section 1054, the page information storing section 1055, the authentication information storing section 1057, the frequency information storing section 1058, and the URL storing section 1059, of the above portal server 1003.

Further, in the contents sales server 5 (FIG. 7) in the aforementioned first embodiment, various programs to be stored in the ROM 21 and the hard disk drive 22 are suitably selected in accordance with the functions of the contents server 1005 (FIG. 20) in the aforementioned second embodiment. Thereby, the control section 20 functions similarly to the control section 1090, the communication control section 1092, the authentication processing section 1095 and the retrieval section 1099, of the above contents sales server 1005, and also the ROM 21, the RAM 24, and the hard disk drive 22 can be used similarly to the customer database section 1094, the page information storing section 1096, the package media information storing section 1098 and the authentication information storing section 1097, of the above contents sales server 1005.

(3) Other Embodiments

In the aforementioned embodiments, there is described a case where the client terminal 2 having a music reproduction function is applied to the terminal unit. However, the present invention is not only limited to this but also other various information processing units such as a personal computer may be applied to the case, provided that a page can be displayed based on the source described by a language such as XML.

Further, in the aforementioned embodiments, there is described a case where the communication processing section 44 of the client terminal 2, the network interface 45 and the like are applied to the transmitting means for transmitting the request signals that requests the first page data (the source of the top page) and the second page data (the source of the A company CD sales page), and to the receiving means for receiving the first page data, the second page data, and the like, after the notification page data (the source of the notification page) was received according to the above request signal. However, the present invention is not only limited to this but also other various configurations may be applied to the case.

Further, in the aforementioned embodiments, there is described a case where the portal server 4 is applied to the page data providing system storing the notification page data (the source of the notification page) that indicates predetermined notification information and the first page data (the source of the top page). However, the present invention is not only limited to this but also information processing units formed by other various configurations may be applied to the case.

Further, in the aforementioned first embodiment, there is described a case where the data communication processing section 15 of the portal server 4 or the like is applied to the receiving means for receiving the request signal that requests the portal server 4 to transmit the first page data (the source of the top page), and to the transmitting means for transmitting the notification page data (the source of the notification page) before this first page data (the source of the top page) is transmitted according to the request signal. However, the present invention is not only limited to this but also other various configurations may be applied to the case.

Further, in the aforementioned second embodiment, there is described a case where the data communication control section 1052 of the portal server 1003 is applied to the receiving means for receiving the request signal that requests the portal server 4 to transmit the first page data (the source of the top page), and to the transmitting means for transmitting the notification page data (the source of the notification page) before this first page data (the source of the top page) is transmitted according to the request signal. However, the present invention is not only limited to this but also other various configurations may be applied to the case.

Further, in the aforementioned embodiments, there is described a case where the contents sales server 5 is applied to the page data providing apparatus, if receiving the acceptance information (the authentication result information) together with the request signal that requests the contents sales server 5 to transmit page data from the terminal unit, for transmitting the page data corresponding to the request signal to the terminal unit. However, the present invention is not only limited to this but also information processing units formed by other various configurations may be applied to the case.

Further, in the aforementioned embodiments, there is described a case where the program for performing the page display processing, as shown in FIGS. 11 and 12 or FIGS. 19 to 16, and FIGS. 21 to 24 (hereinafter, this is referred to as a page data receiving program), has been installed beforehand in the client terminal 2. However, the present invention is not only limited to this but also, for example, a page data receiving program distributed from a predetermined server via the network, may be installed at the time arbitrarily determined by the user.

Further, in the aforementioned embodiments, radio broadcast broadcasted by the radio station is applied to the broadcast that can be received by the client terminals 2 and 1002, but the other case may be possible, such as a case where the client terminals 2 and 1002 receive Internet radio broadcast and satellite radio broadcast so as to obtain the related information (the radio broadcast information), or receive television broadcast broadcasted by a television broadcasting station so as to obtain various broadcast information related to the television program of the television broadcast from the server on the network.

Further, in the aforementioned embodiments, there is described a case where the hardware circuit block, the functional circuit block and the program module are mounted in the client terminals 2 and 1002. However, the present invention is not only limited to this but also they may be mounted in various terminals such as a portable telephone and a personal computer, other than the client terminals 2 and 1002. Thereby, the same processing as the aforementioned client terminals 2 and 1002 can be realized, provided that these hardware circuit block, the functional circuit block and the program module are mounted in the terminals.

INDUSTRIAL APPLICABILITY

The present invention is applicable to the case of displaying Web pages in the display section of a client terminal based on XML source data provided from the server for example.

EXPLANATION OF REFERENCE NUMERALS

1 . . . CONTENTS SALES SYSTEM, 2, 1002 . . . CLIENT TERMINAL, 2A, 1002A . . . APPLICATION MODULE, 2B, 1002B . . . COMMUNICATION MODULE, 3 . . . NETWORK, 4, 1003 . . . PORTAL SERVER, 5, 1005 . . . CONTENTS SALES SERVER, 10, 20, 1023, 1050, 1090 . . . CONTROL SECTION, 30 . . . CPU, 15, 25 . . . DATA COMMUNICATION PROCESSING SECTION, 44 . . . COMMUNICATION PROCESSING SECTION, 45 . . . NETWORK INTERFACE.

The invention claimed is:

1. A page data receiving method implemented on a terminal unit comprising:
transmitting, from the terminal unit, a first request signal to a page data providing apparatus for requesting first page data, the page data providing apparatus performing user authentication to allow the terminal unit access to a content server which is separate from the page data providing apparatus, and the first page being provided by the page data providing apparatus to allow the user of the terminal unit to input a request to receive second page data from the content server;
receiving and automatically displaying without a user's request, at the terminal unit, notification page data from the page data providing apparatus prior to receiving the first page data when the page data providing apparatus determines that the notification page data is stored on a predetermined memory location on the page data providing apparatus, the notification page data providing predetermined notification information related to a status of the page data providing apparatus and provides an option for the user to input a request to continue to receive the first page data; and
receiving, at the terminal unit, the first page data from the page data providing apparatus without receiving notification page data when the page data providing apparatus determines that notification page data is not stored in the predetermined memory location on the page data providing apparatus.

2. The page data receiving method according to claim 1, further comprising:
transmitting, from the terminal unit, a second request signal for requesting second page data to a second page data providing apparatus;

if said second request signal is rejected by the second page data providing apparatus that provides said second page data, requesting the page data providing apparatus to transmit authorization information for making said second page data providing apparatus accept said second request signal, wherein said page data providing apparatus makes a determination in accordance with the second request signal on whether notification page data is stored in the predetermined memory location;

receiving said authorization information from said page data providing apparatus and address information about said notification page data, according to said request;

wherein said notification page data is received by accessing said page data providing apparatus based on said received address information about said notification page data, a notification page indicating said notification information is displayed in a display section of the terminal unit, based on said received notification page data, and said second page data is received from said second page data providing apparatus by transmitting again said second request signal together with said authorization information, according to an operation to said notification page displayed in said display section.

3. The page data receiving method according to claim 2, wherein when in accessing said page data providing apparatus based on said address information about the notification page data, address information corresponding to said second page data is transmitted to the page data providing apparatus, so that said notification page data including address information corresponding to said second page data is received from said page data providing apparatus.

4. The page data receiving method according to claim 2, wherein when in accessing said page data providing apparatus based on said address information about the notification page data, service identification information to identify said second page data is transmitted to the page data providing apparatus, so that said notification page data including additional information corresponding to said service identification information is received from said page data providing apparatus.

5. The page data receiving method according to claim 2, wherein in said notification page data, the status of service corresponding to said second page data is indicated.

6. The page data receiving method according to claim 2, wherein in said first page data, link information to said second page data is included.

7. The page data receiving method according to claim 1, further comprising:

transmitting, from the terminal unit, a second request signal for requesting second web page data to a second page data providing apparatus;

if said second request signal is rejected by the second page data providing apparatus that provides said second page data, requesting the page data providing apparatus to transmit authorization information for making said second page data providing apparatus accept said second request signal;

if said request is rejected by said page data providing apparatus, transmitting user identification information and a password, from said terminal unit, to the page data providing apparatus, wherein said page data providing apparatus makes a determination in accordance with the second request signal on whether notification page data is stored in the predetermined memory location; and receiving an authentication session ID transmitted from the page data providing apparatus and address information about said notification page data, which are obtained after said page data providing apparatus authenticates said user identification information and password, wherein said notification page data is received by accessing said first page data providing apparatus by adding said authentication session ID, based on said received address information about said notification page data, a notification page indicating said notification information is displayed in the display section, based on said received notification page data, a signal for requesting said information necessary for acceptance is transmitted again to said page data providing apparatus, said information necessary for acceptance transmitted by said page data providing apparatus according to said request is received, and said second page data is received from said second page data providing apparatus after said second request signal is transmitted again together with said information necessary for acceptance.

8. The page data receiving method according to claim 7, wherein when in accessing said page data providing apparatus based on the address information about said notification page data, address information corresponding to said second page data is transmitted to the page data providing apparatus, so that said notification page data including the address information corresponding to said second page data is received from said page data providing apparatus.

9. The page data receiving method according to claim 7, wherein when in accessing said page data providing apparatus based on the address information about said notification page data, service identification information to identify said second page data is transmitted to the page data providing apparatus, so that said notification page data including additional information corresponding to said service identification information is received from said page data providing apparatus.

10. The page data receiving method according to claim 7, wherein in said notification page data, the status of service corresponding to said second page data is indicated.

11. The page data receiving method according to claim 7, wherein in said first page data, link information to said second page data is included.

12. A page data providing method implemented on a page data providing apparatus storing notification page data indicating predetermined notification information and first page data, comprising:

receiving, at the page data providing apparatus, a first request signal that requests said first page data and is sent from a terminal unit;

performing, at the page data providing apparatus, user authentication to allow the terminal unit access to a content server which is separate from the page data providing apparatus, and the first page data being provided by the page data providing apparatus to allow the user of the terminal unit to input a request to receive second page data from the content server;

transmitting, from the page data providing apparatus, said notification page data to said terminal unit before transmitting said first page data when determining that the notification page data is stored on a predetermined memory location on the page data providing apparatus, the notification page data providing predetermined notification information related to a status of the page data providing apparatus and providing an option for the user to input a request to continue to receive the first page data the first page data, and the notification page data being automatically displayed without a user's request at the terminal unit prior to the page data providing apparatus transmitting the first page data; and transmitting, from the page data providing apparatus, the first page data without transmitting notification page data when the page data providing apparatus determines that notification page data is not stored in the predetermined memory location on the page data providing apparatus.

13. The page data providing method according to claim 12, wherein wherein if the terminal unit transmits a second request signal to a second page data providing apparatus for requesting second page data and if said second request signal from said terminal unit is rejected by the second page data providing apparatus, receiving a request for authorization information for making the second page data providing apparatus accept said second request signal from said terminal unit, wherein said page data providing apparatus makes a determination in accordance with the second request signal on whether notification page data is stored in the predetermined memory location, and transmitting said authorization information and address information about said notification page data to said terminal unit, and if there is access from said terminal unit that received said authorization information and the address information about said notification page data based on the above address information, said notification page data is transmitted to said terminal unit, so that a notification page based on said notification page data is displayed in the display section of said terminal unit.

14. The page data providing method according to claim 13, wherein if there is access from said terminal unit based on the address information about said notification page data, if address information corresponding to said second page data is received from said terminal unit, said notification page data including the address information corresponding to the second page data is transmitted to said terminal unit.

15. The page data providing method according to claim 13, wherein if there is access from said terminal unit based on the address information about said notification page data, if service identification information to identify said second page data is received from said terminal unit, said notification page data including additional information that corresponds to the service identification information is transmitted to said terminal unit.

16. The page data providing method according to claim 13, wherein in said notification page data, also the status of service corresponding to said second page data is indicated.

17. The page data providing method according to claim 13, wherein in said first page data, also link information to said second page data is included.

18. The page data providing method according to claim 12, wherein wherein if the terminal unit transmits a second request signal to a second page data providing apparatus for requesting second page data and if said second request signal from said terminal unit is rejected by the second page data providing apparatus, receiving with an authentication session ID a signal that requests authorization information for making the second page data providing apparatus accept said second request signal, wherein said page data providing apparatus makes a determination in accordance with the second request signal on whether notification page data is stored in the predetermined memory location, and when the validity period of said authentication session ID has been expired, transmitting an authentication response indicating an authentication error to said terminal unit;

receiving user identification information and a password from said terminal unit;

performing authentication processing based on said user identification information and password, issuing an authentication session ID, and if there is said notification page data in the predetermined memory location, transmitting the authentication session ID to said terminal unit together with address information about the above notification page; and performing authentication processing by said authentication session ID in response to access to the address of said notification page data to which said authentication session ID has been added, and if the authentication is allowed, the above notification page data is transmitted to said terminal unit.

19. The page data providing method according to claim 18, wherein when the page data providing apparatus has been accessed from said terminal unit based on the address information about said notification page data, if address information corresponding to said second page data is received from said terminal unit, said notification page data including the address information corresponding to the above second page data is transmitted to said terminal unit.

20. The page data providing method according to claim 18, wherein when the page data providing apparatus has been accessed from said terminal unit based on the address information about said notification page data, if service identification information to identify said second page data is received from said terminal unit, said notification page data including additional information that corresponds to the above service identification information is transmitted to said terminal unit.

21. The page data providing method according to claim 18, wherein in said notification page data, the status of service corresponding to said second page data is indicated.

22. The page data providing method according to claim 18, wherein in said first page data, link information to said second page data is included.

23. A terminal unit comprising:

transmitting means for transmitting a first request signal to a page data providing apparatus for requesting first page data, the page data providing apparatus performing user authentication to allow the terminal unit access to a content server which is separate from the page data providing apparatus, and the first page data being provided by the page data providing apparatus to allow the user of the terminal unit to input a request to receive second page data from the content server; and receiving means, for receiving and automatically displaying without a user's request, notification page data from the page data providing apparatus prior to receiving the first page data when the page data providing apparatus determines that the notification page data is stored on a predetermined memory location on the page data providing apparatus, the notification page data providing predetermined notification information related to a status of the page data providing apparatus and provides an option for the user to input a request to continue to receive the first page data, and receiving the first page data from the page data providing apparatus without receiving notification page data when the page data providing apparatus determines that notification page data is not stored in the predetermined memory location on the page data providing apparatus.

24. The terminal unit according to claim 23, wherein:
said transmitting means transmits a second request signal to a second page data providing apparatus for requesting second page data,
wherein if said second request signal transmitted by said transmitting means is rejected by the second page data providing apparatus that provides said second page data, said transmitting means transmits a request signal for requesting the page data providing apparatus to transmit authorization information for making said second page data providing apparatus accept said second request signal, wherein said page data providing apparatus makes a determination in accordance with the second request signal on whether notification page data is stored in the predetermined memory location;
said receiving means,
receives said authorization information transmitted from said page data providing apparatus according to said request, and address information about said notification page data,
receives said notification page data by accessing said page data providing apparatus, based on said received address information about said notification page data, and
transmits said notification page in which notification information is indicated to a display section, based on said received notification page data; and
said transmitting means,
transmits again said second request signal together with said authorization information, according to an operation to said notification page displayed in said display section; and
said receiving means,
receives said second page data from said second page data providing apparatus in response to said retransmission.

25. The terminal unit according to claim 24, wherein
said receiving means, when in accessing said page data providing apparatus based on the address information about said notification page data, transmits address information that corresponds to said second page data to the page data providing apparatus, so as to receive said notification page data including the address information corresponding to said second page data from said page data providing apparatus.

26. The terminal unit according to claim 24, wherein
said receiving means, when in accessing said page data providing apparatus based on the address information about said notification page data, transmits service identification information to identify said second page data to the page data providing apparatus, so as to receive said notification page data including additional information that corresponds to said service identification information from said page data providing apparatus.

27. The terminal unit according to claim 23, wherein:
said transmitting means transmits a second request signal to a second page data providing apparatus for requesting second page data,
wherein if said second request signal transmitted by said transmitting means is rejected by the second page data providing apparatus that provides said second page data, said transmitting means transmits a request signal for requesting the page data providing apparatus to transmit authorization information for making said second page data providing apparatus accept said second request signal, wherein said page data providing apparatus makes a determination in accordance with the second request signal on whether notification page data is stored in the predetermined memory location, and
if said request is rejected by said page data providing apparatus, said transmitting means transmits user identification information and a password to the page data providing apparatus;
said receiving means,
receives an authentication session ID transmitted from the page data providing apparatus as a result of that said page data providing apparatus authenticates said user identification information and password, and the address information about said notification page data,
receives said notification page data by accessing said page data providing apparatus by adding said authentication session ID based on said received address information about said notification page data, and
transmits a notification page in which said notification information is indicated to a display section, based on said received notification page data;
said transmitting means,
transmits again said signal for requesting information necessary for acceptance to said page data providing apparatus;
said receiving means,
receives said authorization information transmitted by said page data providing apparatus, according to said request;
said transmitting means,
transmits again said second request signal together with said information; and
said receiving means,
receives said second page data from said second page data providing apparatus, according to said retransmission.

28. The terminal unit according to claim 27, wherein
said receiving means, when in accessing said page data providing apparatus based on the address information about said notification page data, transmits address information that corresponds to said second page data to the page data providing apparatus, so as to receive said notification page data including the address information corresponding to said second page data from said page data providing apparatus.

29. The terminal unit according to claim 27, wherein
when in accessing said page data providing apparatus based on the address information about said notification page data, service identification information to identify said second page data is transmitted to the page data providing apparatus, so that said notification page data including additional information that corresponds to said service identification information is received from said page data providing apparatus.

30. A page data providing apparatus storing notification page data indicating predetermined notification information and first page data, comprising:
receiving means for receiving a first request signal for requesting said first page data from a terminal unit;
authenticating means for performing user authentication to allow the terminal unit access to a content server which is separate from the page data providing apparatus, and the first page data being provided by the page data providing apparatus to allow the user of the terminal unit to input a request to receive second page data from the content server; and transmitting means,
for transmitting said notification page data to said terminal unit, when determining that the notification page data is stored on a predetermined memory location on the page data providing apparatus, the notification page data providing predetermined notification information related to a status of the page data providing apparatus and providing an option for the user to input a request to continue to receive the first page data, and the notification page data being automatically displayed without a user's request at the terminal unit prior to the page data providing apparatus transmitting the first page data, and
for transmitting the first page data without transmitting notification page data when the page data providing apparatus determines that notification page data is not stored in the predetermined memory location on the page data providing apparatus.

31. The page data providing apparatus according to claim 30, wherein:
wherein if the terminal unit transmits a second request signal to a second page data providing apparatus for requesting second page data and said second request signal from said terminal unit is rejected by a second page data providing apparatus, and said terminal unit requests authorization information for making the second page data providing apparatus accept said second request signal, wherein said page data providing apparatus makes a determination in accordance with the second request signal on whether notification page data is stored in the predetermined memory location, said transmitting means transmits said authorization information and address information about said notification page data to said terminal unit; and
if said receiving means is accessed from said terminal unit based on the address information, said transmitting means transmits said notification page data to said terminal unit, so that a notification page based on said notification page data is displayed in the display section of said terminal unit.

32. The page data providing apparatus according to claim 31, wherein
when said receiving means has been accessed from said terminal unit based on the address information about said notification page data, if said receiving means receives address information corresponding to said second page data from said terminal unit, said transmitting means, transmits said notification page data including the address information corresponding to the second page data to said terminal unit.

33. The page data providing apparatus according to claim 31, wherein
when said receiving means has been accessed from said terminal unit based on the address information about said notification page data, if said receiving means receives service identification information for identifying said second page data from said terminal unit, said transmitting means, transmits said notification page data including additional information that corresponds to the service identification information to said terminal unit.

34. The page data providing apparatus according to claim 31, wherein;
in said notification page data, the status of service corresponding to said second page data is indicated.

35. The page data providing apparatus according to claim 31, wherein in said first page data, link information to said second page data is included.

36. The page data providing apparatus according to claim 30, wherein:
wherein if the terminal unit transmits a second request signal to a second page data providing apparatus for requesting second page data and said second request signal from said terminal unit was rejected by a second page data providing apparatus, said receiving means receives a signal for requesting authorization information for making the second page data providing apparatus accept said second request signal together with an authentication session ID, wherein said page data providing apparatus makes a determination in accordance with the second request signal on whether notification page data is stored in the predetermined memory location;
said transmitting means,
when the validity period of said authentication session ID has expired, transmits an authentication response indicating the authentication error to said terminal unit;
said receiving means,
receives user identification information and a password from said terminal unit; and
said transmitting means,
performs authentication processing based on said user identification information and password, issues an authentication session ID, and if there is said notification page data in the predetermined memory location, transmits said notification page data to said terminal unit together with address information about the notification page data, performs authentication processing by said authentication session ID according to access to the address of said notification page data to which said authentication session ID has been added, and if the authentication is allowed, transmits the above notification page data to said terminal unit.

37. The page data providing apparatus according to claim 36, wherein when said receiving means has been accessed from said terminal unit based on the address information about said notification page data, if said receiving means receives address information corresponding to said second page data from said terminal unit, said transmitting means transmits said notification page data including the address information corresponding to the second page data to said terminal unit.

38. The page data providing apparatus according to claim 36, wherein when said receiving means has been accessed from said terminal unit based on the address information about said notification page data, if said receiving means receives service identification information for identifying said second page data from said terminal unit, said transmitting means transmits said notification page data including additional information that corresponds to the service identification information to said terminal unit.

39. The page data providing apparatus according to claim 36, wherein in said notification page data, also the status of service corresponding to said second page data is indicated.

40. The page data providing apparatus according to claim 36, wherein in said first page data, also link information to said second page data is included.

41. A computer readable storage medium encoded with computer executable instructions, which when executed by a terminal unit, cause the terminal unit to perform a method comprising:
transmitting, from the client terminal device, a first request signal to a page data providing apparatus for requesting first page data, the page data providing apparatus performing user authentication to allow the terminal unit access to a content server which is separate from the page data providing apparatus, and the first page data being provided by the page data providing apparatus to allow the user of the terminal unit to input a request to receive second page data from the content server;

receiving and automatically displaying without a user's request, at the client terminal device, notification page data from the page data providing apparatus prior to receiving the first page data when the page data providing apparatus determines that the notification page data is stored on a predetermined memory location on the page data providing apparatus, the notification page data providing predetermined notification information related to a status of the page data providing apparatus and provides an option for the user to input a request to continue to receive the first page data; and receiving, at the client terminal device, the first page data from the page data providing apparatus without receiving notification page data when the page data providing apparatus determines that notification page data is not stored in the predetermined memory location on the page data providing apparatus.

42. The page data receiving method according to claim 1, wherein the notification page data provides predetermined notification information related to maintenance information of the page data providing apparatus.

* * * * *